United States Patent
Tzekin et al.

(10) Patent No.: US 8,108,278 B2
(45) Date of Patent: Jan. 31, 2012

(54) NON-REVERSIBLE PAYMENT PROCESSING

(75) Inventors: Boyan Gueorguiev Tzekin, San Francisco, CA (US); Christie Lau, San Jose, CA (US)

(73) Assignee: eBay Inc., San Jose, CA (US)

( * ) Notice: Subject to any disclaimer, the term of this patent is extended or adjusted under 35 U.S.C. 154(b) by 316 days.

(21) Appl. No.: 12/211,172

(22) Filed: Sep. 16, 2008

(65) Prior Publication Data
US 2010/0070411 A1    Mar. 18, 2010

(51) Int. Cl.
*G06Q 40/10* (2006.01)
(52) U.S. Cl. .............................................. 705/35; 705/4
(58) Field of Classification Search ............ 705/40, 705/35
See application file for complete search history.

(56) References Cited

U.S. PATENT DOCUMENTS

| | | | | |
|---|---|---|---|---|
| 6,070,150 | A * | 5/2000 | Remington et al. | 705/34 |
| 2006/0195398 | A1 * | 8/2006 | Dheer et al. | 705/40 |
| 2007/0282743 | A1 * | 12/2007 | Lovelett et al. | 705/40 |
| 2008/0162295 | A1 * | 7/2008 | Bedier | 705/26 |

OTHER PUBLICATIONS

Bob Sullivan, "Debit or Credit? Here's the Answer," Sep. 2007, MSNBC, http://moneymanagement.unt.edu/pdf/documents/debitorcredit.pdf, pp. 1-6.*

* cited by examiner

*Primary Examiner* — Elizabeth Rosen
*Assistant Examiner* — Abdul Basit
(74) *Attorney, Agent, or Firm* — Schwegman, Lundberg & Woessner, P.A.

(57) ABSTRACT

Methods and system for non-reversible payment processing are described. In one embodiment, a request for non-reversible payment for a sender may be received. The request for non-reversible payment may include a payment amount and a payment receiver identifier. The payment receiver identifier may be associated with a payment receiver. A sender account of the sender may be decreased by the payment amount. A payment receiver account of the payment receiver may be increased by the payment amount. A notification of non-reversible payment may be provided to a payment receiver that the increasing of the payment receiver account by the payment amount is non-reversible based on the receiving of the request for non-reversible payment.

25 Claims, 16 Drawing Sheets

NON-REVERSIBLE PAYMENT PROCESSING

BACKGROUND

Some online merchants limit the size of credit card and balance account transactions they are willing to accept because they do not want to accept the risk of large value transactions being reversed or disputed and/or they do not want to pay a percentage (e.g., 3%) on a large value transaction. Instead, a merchant may request a bank wire transfer for a large value transaction.

BRIEF DESCRIPTION OF THE DRAWINGS

Some embodiments are illustrated by way of example and not limitation in the figures of the accompanying drawings in which.

DETAILED DESCRIPTION

Example methods and systems for non-reversible payment processing are described. In the following description, for purposes of explanation, numerous specific details are set forth in order to provide a thorough understanding of example embodiments. It will be evident, however, to one skilled in the art that embodiments of the present invention may be practiced without these specific details.

In an example embodiment, the request for non-reversible payment may enable a sender to make payment to a payment receiver that a payment receiver may otherwise not accept absent a money wire because of a percentage due on a high value transaction. For example, the payment receiver may not wish to pay three percent to a provider to process the payment when a money wire could be available for a flat fee. The non-reversible nature of the payment may reduce the risk of the provider and enable processing of the payment at a reduced cost.

Figure 1:
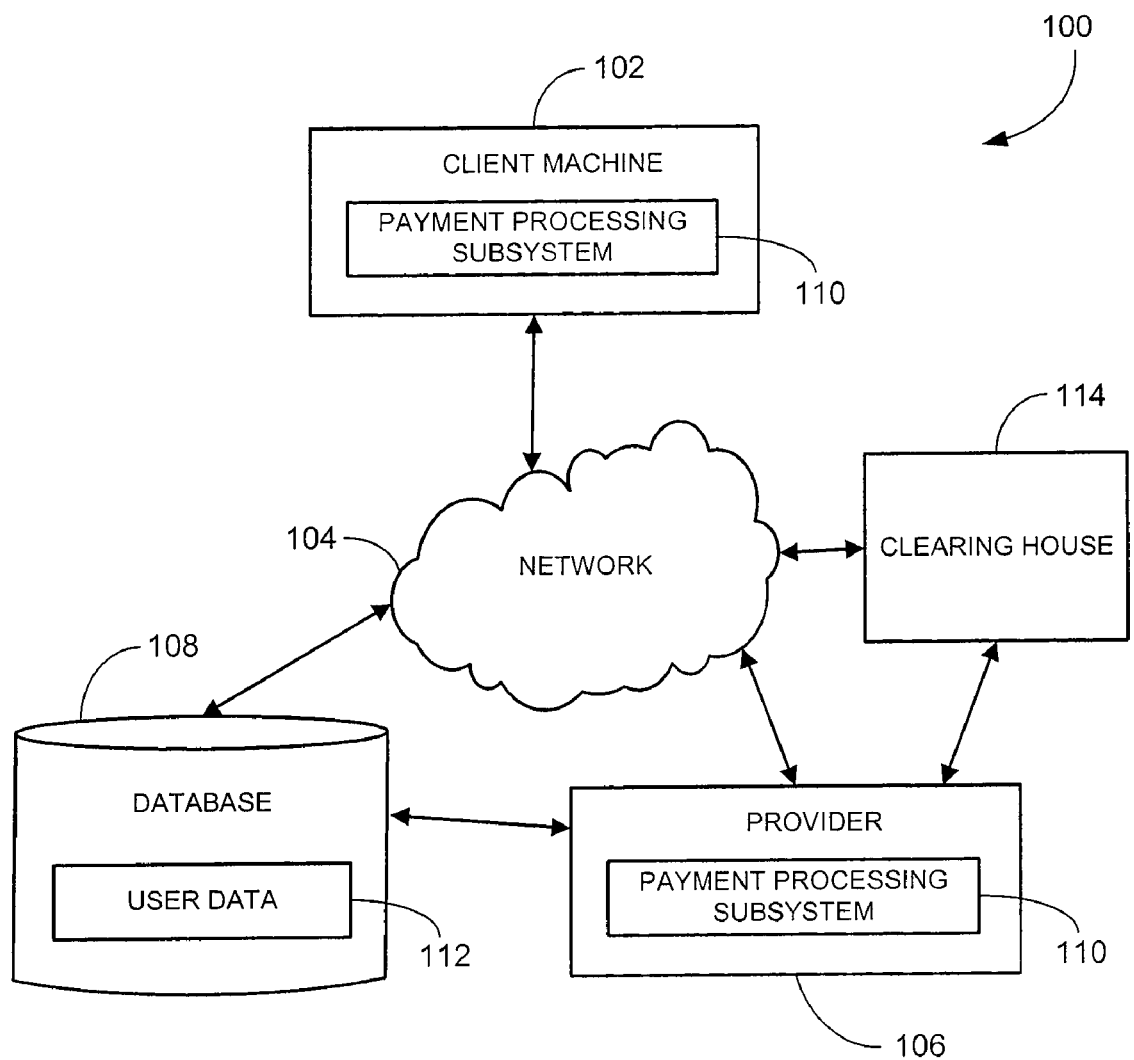
FIG. 1 is a block diagram of a system, according to example embodiments.

FIG. 1 illustrates an example system 100 in which a client machine 102 may be in communication with a provider 106 over a network 104. A user may operate the client machine 102 may communicate with the provider 106 to send or receive non-reversible payments.

Examples of the client machine 102 include a set-top box (STB), a receiver card, a mobile telephone, a personal digital assistant (PDA), a display device, a portable gaming unit, and a computing system; however other devices may also be used.

The network 104 over which the client machine 102 and the provider 106 are in communication may include a Global System for Mobile Communications (GSM) network, an Internet Protocol (IP) network, a Wireless Application Protocol (WAP) network, a Wi-Fi network, or an IEEE 802.11 standards network as well as various combinations thereof. Other conventional and/or later developed wired and wireless networks may also be used.

The provider 106 may operate on a computer system maintained or controlled by a business entity. For example, the provider 106 may be maintained by PayPal, Inc. of San Jose, Calif.

The provider 106 may also be in communication with a database 108. The database 108 stores user data 112 which may include information regarding users of the provider 106. The user data 112 may include a variety of information regarding a user including, by way of example, transactional information, a phone call record, a screen recording, a social security number, an e-mail address, a telephone number, an electronic token, or the like.

A payment processing subsystem 110 may be deployed in the client machine 102 and/or the provider 106 to receive a request for non-reversible payment for a sender, decrease a sender account of the sender by a payment amount, increase a payment receiver account of the payment receiver by the payment amount, and provide a notification of non-reversible payment to a payment receiver that the increasing of the payment receiver account by the payment amount is non-reversible.

The decreasing of the sender account may be performed by providing a payment transaction request to a clearing house 114 (e.g., an automatic clearing house (ACH)) to decrease the sender account by the payment amount. Similarly, the increasing of the payment receiver account may be performed by providing a payment transaction request to the clearing house 114 to increase the payment receiver account by the payment amount. The clearing house may be separate from or deployed within the provider 106.

Figure 2:
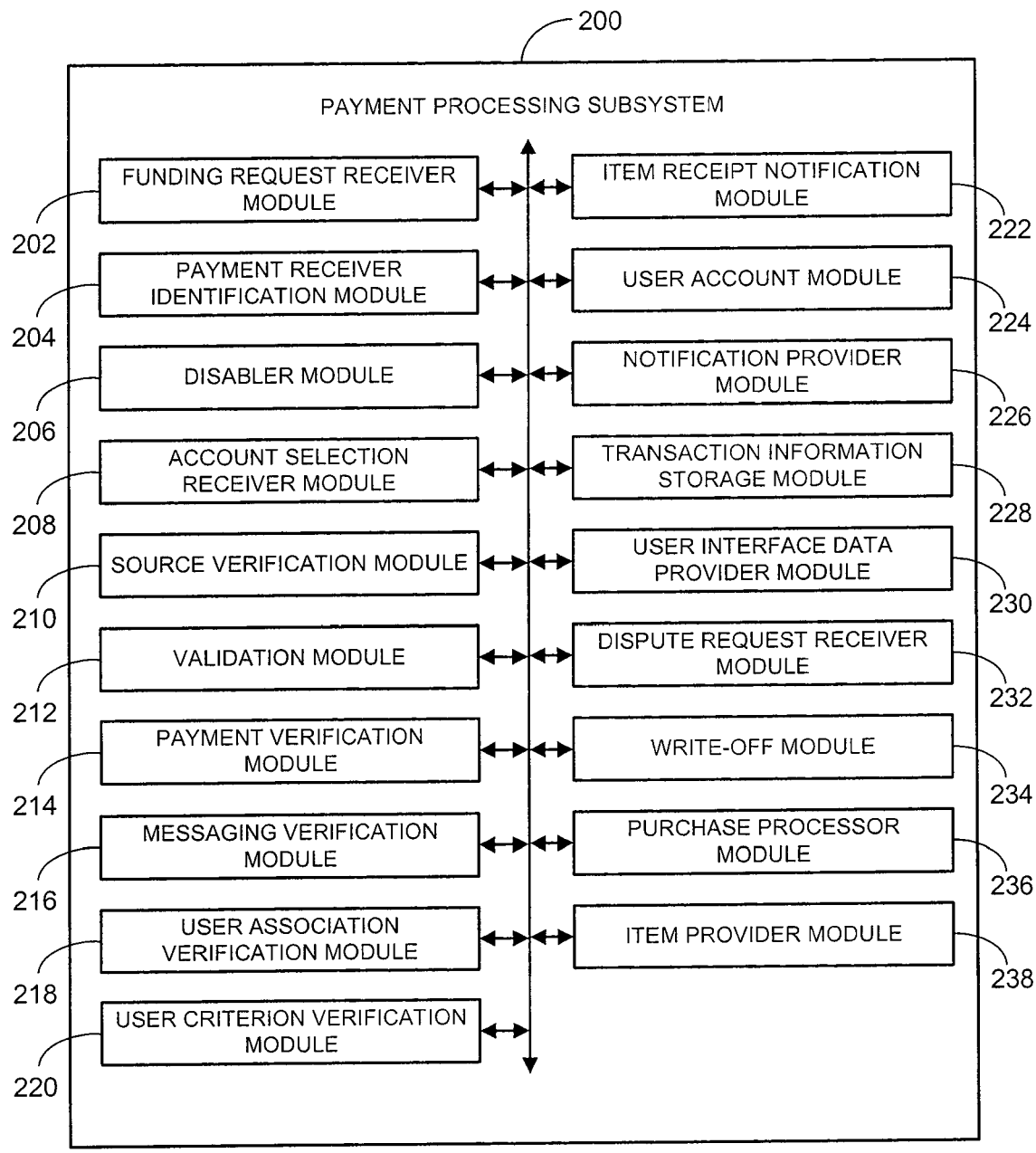
FIG. 2 is a block diagram of an example payment processing subsystem that may be deployed within the system of FIG. 1 according to an example embodiment.

FIG. 2 illustrates an example payment processing subsystem 110 that may be deployed in the client machine 102 and/or the provider 106 of the system 100 (see FIG. 1) or otherwise deployed in another system. The payment processing subsystem 110 may include a funding request receiver module 202, a payment receiver identification module 204, a disabler module 206, an account selection receiver module 208, a source verification module 210, a validation module 212, a payment verification module 214, a messaging verification module 216, a user association verification module 218, a user criterion verification module 220, an item receipt notification module 222, a user account module 224, a notification provider module 226, a transaction information storage module 228, a user interface data provider module 230, a dispute request receiver module 232, a write-off module 234, a purchase processor module 236, and/or an item provider module 238. Other modules may also be included. In various embodiments, the modules may be distributed so that some of the modules may be deployed in the client machine 102 and some of the modules may be deployed in the provider 106.

The funding request receiver module 202 receives a request for non-reversible payment for a sender. The request for non-reversible payment may include a payment amount and a payment receiver identifier, identifying the entity (e.g., person or business) to whom the payment is to be made. For example, the payment receiver identifier may be associated with a payment receiver.

The payment receiver identification module 204 identifies a payment receiver based on the payment receiver identifier.

The payment receiver identifier may include, by way of example, a telephone number, an e-mail address, a payment receiver name, a payment receiver account number, or the like. A single payment receiver identifier or multiple payment receiver identifiers may be used. The disabler module 206 disables a credit card funding source from the available sender accounts and/or disallows disputes based on receipt of the request for non-reversible payment.

The account selection receiver module 208 receives a selection of the sender account from an available sender account from the sender. The receiving of the selection may be based on the disabling of the credit card funding source. For example, the selection may be received through a user interface presented to the sender on the client machine 102.

The source verification module 210 receives sender verification information, accesses sender data associated with the sender (e.g., from the database 108), and verifies the sender verification information based on the sender data. For example, a sender may enter a social security number for verifying that the consumer is the holder of the account.

The validation module 212 verifies that the request for non-reversible payment satisfies a validity criterion. The validity criterion may include, by way of example, a sender geographical location, a payment receiver geographical location, the payment amount, or the like.

The payment verification module 214 verifies the payment amount meets an amount criterion. The amount criterion may, in an example embodiment, may be established by the provider 106. The messaging verification module 216 sends a verification message to the sender and/or the payment receiver and receives a verification response.

The user association verification module 218 verifies a user association between a sender and a payment receiver. The user association may be, by way of example, a prior transaction, a communication session (e.g., using SKYPE software), membership in a social network, a business relationship, or the like. The user association may limit the risk of the provider 106 in processing the payment request.

The user criterion verification module 220 verifies a user criterion of a sender and/or a payment receiver. The user criterion may include, by way of example, user feedback, a number of transactions associated with another user, membership in a social network, a membership period with the provider 106, or the like. The item receipt notification module 222 receives item receipt notification from the sender that an item associated with the request for non-reversible payment has been received.

The user account module 224 decreases a sender account of a sender by the payment amount, increases a payment receiver account of the payment receiver by the payment amount, decreases the sender account by a user transfer cost, and/or decreases the target funding source by a user transfer cost. The sender transfer cost and/or the payment receiver transfer cost may be a fixed transfer cost and/or a variable transfer cost. The decreasing of the sender account and/or the increasing of the payment receiver account may be based on the verifying of the sender verification, satisfying the validity criterion, verification of the payment amount, receiving of the verification response, verifying the user association, verifying of the user criterion, and/or identification of the payment receiver. The increasing of the payment receiver account may be based on receipt of the item receipt notification.

In an example embodiment, the decreasing may be performed by providing a payment transaction request to the clearing house 114 to decrease the sender account by the payment amount and/or the increasing may be performed by providing a payment transaction request to the clearing house 114 to increase the payment receiver account by the payment amount.

The notification provider module 226 provides a notification of non-reversible payment to a payment receiver that the increasing of the payment receiver account by the payment amount is non-reversible based on the receiving of the request for non-reversible payment and/or provides a refusal notification to the sender based on the receiving of the request for non-reversible payment and the dispute request. The providing of the notification of non-reversible payment is based on the verifying of the sender verification and/or identification of the payment receiver.

The transaction information storage module 228 stores transaction information associated with the request for non-reversible payment (e.g., in the database 108). The transaction information includes, by way of example, a time of the transfer request, users, amount, or the like.

The user interface data provider module 230 provides user interface data based on the receiving of the notification of non-reversible payment. The user interface data may be capable of being used to present a user interface with a disabled option to reverse the decreasing of the sender account.

The dispute request receiver module 232 receives a dispute request associated with the decreasing of the sender account from the sender. The write-off module 234 alters value in the sender account based on the request for non-reversible payment and the dispute request and/or records a write-off indication (e.g., in the database 108) based on the receiving of the request for non-reversible payment and the dispute request.

The purchase processor module 236 processes purchase of an item based on the receiving of the request for non-reversible payment, the decreasing of the sender account and the increasing of the payment receiver account. The item provider module 238 provides the item to the sender based on the processing of the purchase. The item may be provided physically, electronically, or otherwise provided.

Figure 3:
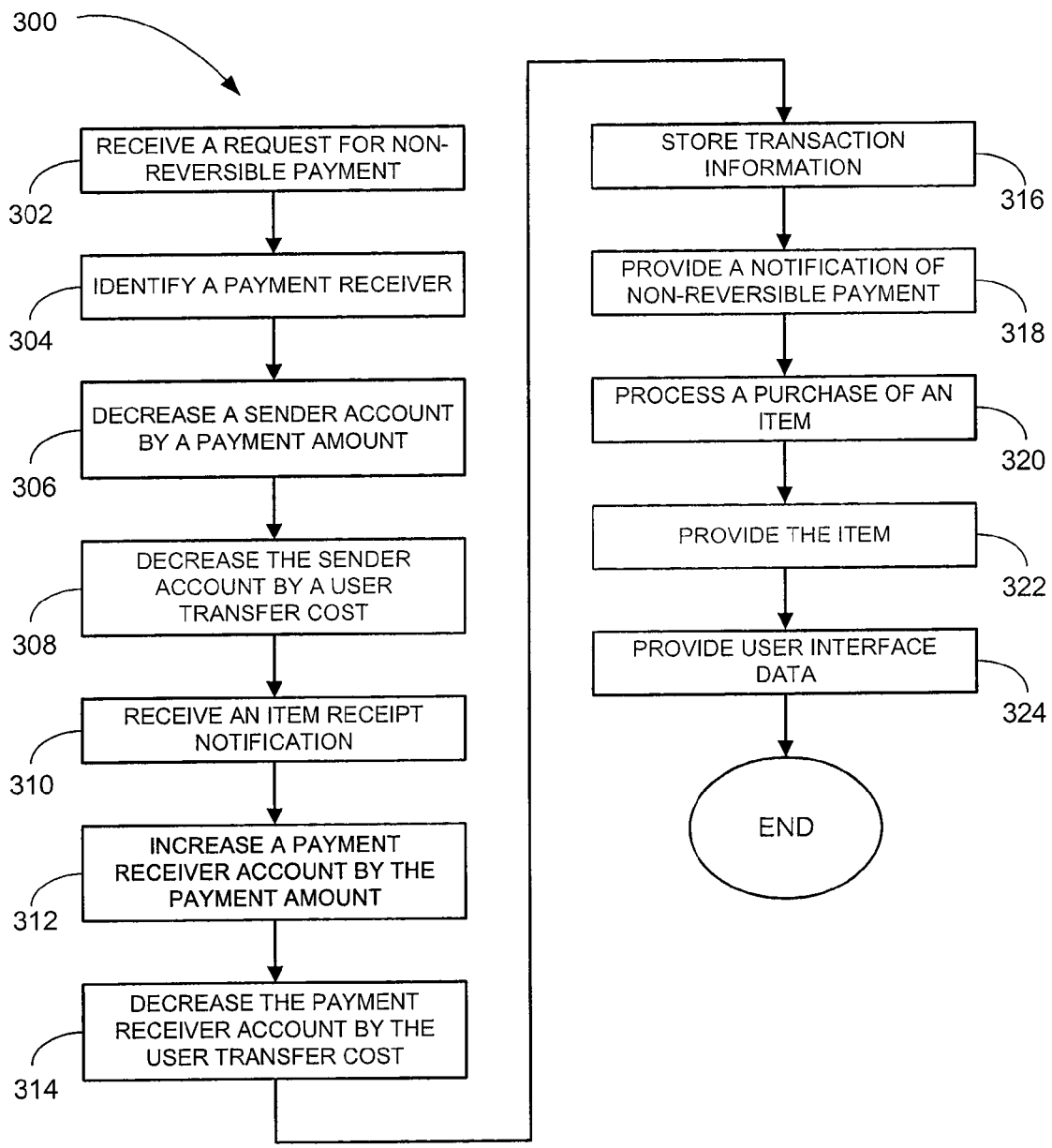
FIGS. 3-12 are flowcharts illustrating a method for payment processing according to an example embodiment.

FIG. 3 illustrates a method 300 for payment processing according to an example embodiment. The method 300 may be performed by the client machine 102 and/or the provider 106 of the system 100 (see FIG. 1) or otherwise performed. In an example embodiment, the method 300 may be used in the performance of payment processing to present a user interface with a disabled option to reverse the decreasing of the sender account.

A request for non-reversible payment for a sender is received at block 302. The request for non-reversible payment may be received through an API, through a user interface, or may be otherwise received. The request for non-reversible payment may include a payment amount, a payment receiver identifier, a currency type, a payment type, and/or sender account identification. The payment amount may be in a real currency and/or a virtual currency. The payment receiver identifier may be associated with a payment receiver.

The payment receiver may be identified based on the payment receiver identifier at block 304. A single payment receiver identifier or multiple payment receiver identifiers may be used. The payment receiver identifier may include, by way of example, a telephone number, an e-mail address, a payment receiver name, a payment receiver account number, or the like. However, other payment receiver identifiers may also be used.

A sender account of the sender is decreased by the payment amount at block 306. The sender account may be a balance account, a bank account, a credit card account, or the like. The sender account may be decreased directly (e.g., by the provider 106), by providing a payment transaction request to the clearing house 114 to decrease the sender account by the payment amount, or may be otherwise made.

The sender account may be decreased by a user transfer cost at block 308. The sender transfer cost may be a fixed transfer cost (e.g., $15.00) or a variable transfer cost (e.g., a percentage of the transaction). Other simple and complex pricing structures may also be used.

An item receipt notification may be received from the sender that an item associated with the request for non-reversible payment has been received at block 310. The item receipt notification may be used to verify that an item with which the payment may be associated has been received.

A payment receiver account of the payment receiver is increased by the payment amount at block 312. The payment receiver account may be a balance account, a bank account, a credit card account, or the like. The increasing of the payment receiver account may be based on identification of the payment receiver and/or receipt of the item receipt notification. The payment receiver account may be increased directly (e.g., by the provider 106), by providing a payment transaction request to the clearing house 114 to increase the payment receiver account by the payment amount, or may be otherwise made.

The target funding source may be decreased by a user transfer cost at block 314. The payment receiver transfer cost may be a fixed transfer cost or a variable transfer cost (e.g., a percentage of the transaction). The user transfer cost of the sender and the payment receiver may be the same transfer cost or a different transfer cost.

Transaction information associated with the request for non-reversible payment may be stored at block 316. The transaction information may include, by way of example, a time of the transfer request, users involved in the transaction, transfer amount, etc.

At block 318, a notification of non-reversible payment that the increasing of the payment receiver account by the payment amount is non-reversible is provided to a payment receiver based on receipt of the request for non-reversible payment and/or identification of the payment receiver.

A purchase of an item may be processed based on the receiving of the request for non-reversible payment, the decreasing of the sender account, and the increasing of the payment receiver account at block 320.

The item may be provided to the sender based on the processing of the purchase at block 322. The item may be provided electronically, physically, or may be otherwise provided.

User interface data may be provided at block 324 based on the receiving of the notification of non-reversible payment. The user interface data may be capable of being used to present a user interface with a disabled option to reverse the decreasing of the sender account. The user interface data may be provided through an API, in the form of a user interface, or may be otherwise provided.

Figure 4:
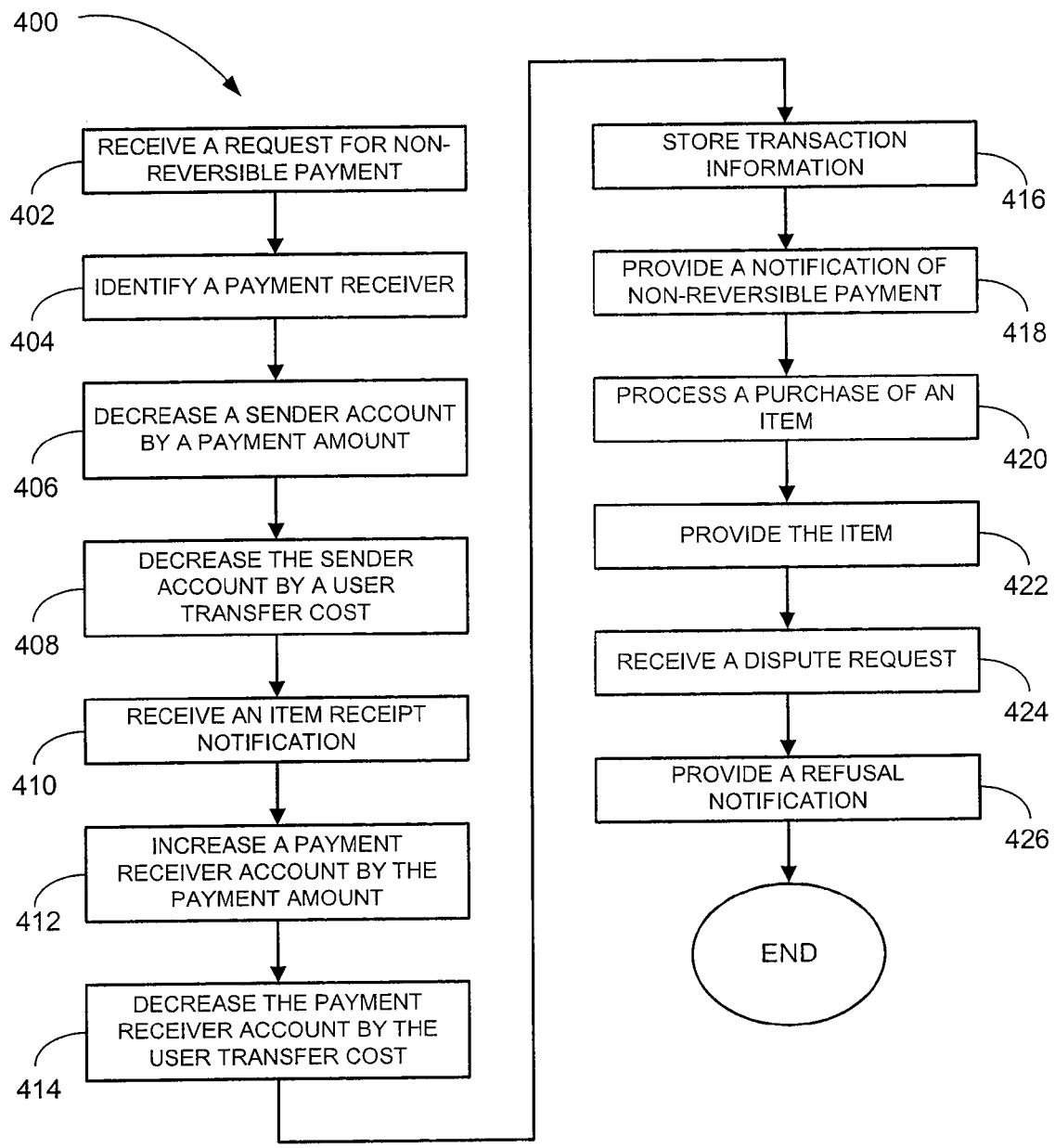

FIG. 4 illustrates a method 400 for payment processing according to an example embodiment. The method 400 may be performed by the client machine 102 and/or the provider 106 of the system 100 (see FIG. 1) or otherwise performed. In an example embodiment, the method 400 may be used in the performance of payment processing to process a dispute request.

A request for non-reversible payment for a sender is received at block 402. The payment receiver may be identified based on the payment receiver identifier at block 404. A sender account of the sender is decreased by the payment amount at block 406.

The sender account may be decreased by a user transfer cost at block 408. An item receipt notification may be received from the sender that an item associated with the request for non-reversible payment has been received at block 410.

A payment receiver account of the payment receiver is increased by the payment amount at block 412. The target funding source may be decreased by a user transfer cost at block 414. The transfer cost may be a fee paid to the provider 106 to process the payment.

Transaction information associated with the request for non-reversible payment may be stored at block 416. At block 418, a notification of non-reversible payment that the increasing of the payment receiver account by the payment amount is non-reversible is provided to a payment receiver based on the receiving of the request for non-reversible payment and/or identification of the payment receiver.

A purchase of an item may be processed based on the receiving of the request for non-reversible payment, the decreasing of the sender account and the increasing of the payment receiver account at block 420. The item may be provided to the sender based on the processing of the purchase at block 422.

A dispute request associated with the decreasing of the sender account may be received from the user at block 424. The dispute request may be made by the sender based on a failure to initiate payment, a failure to receive an item, a failure to receive the item purchased, or the like.

A refusal notification may be provided to the sender at block 426 based on the receiving of the request for non-reversible payment and the dispute request. The refusal notification may advise the sender that the payment may not be reversed (e.g., by the provider 106). The sender may, upon receipt of the notification, contact the payment receiver to resolve any outstanding issue regarding the payment. The refusal by the provider 106 to engage in dispute resolution may reduce the risk associated with the processing of a particular payment. The reduction of the risk may enable the provider 106 to charge a lower transfer cost and/or realize additional profit from processing a payment through use of the method 400.

Figure 5:
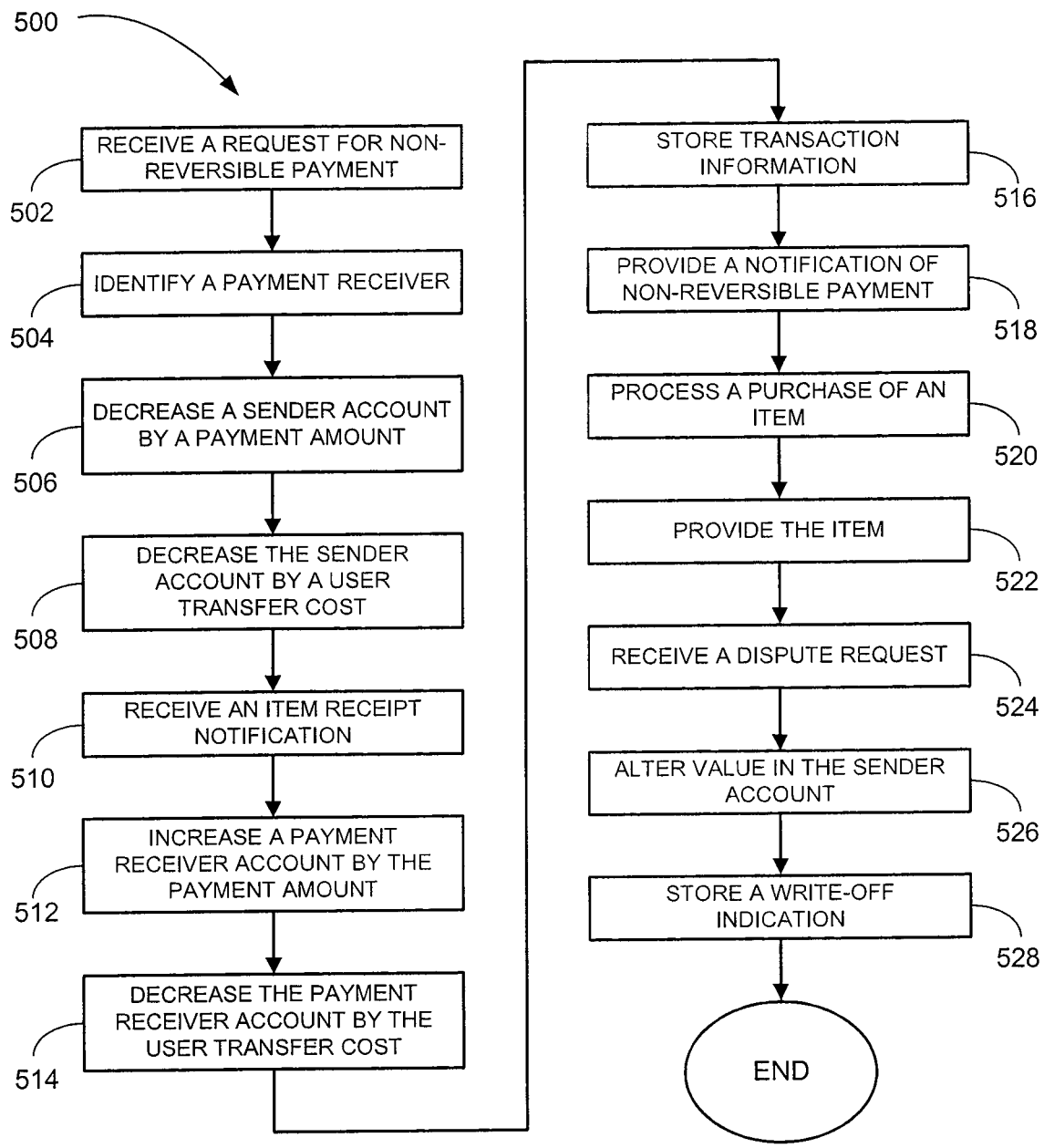

FIG. 5 illustrates a method 500 for payment processing according to an example embodiment. The method 500 may be performed by the client machine 102 and/or the provider 106 of the system 100 (see FIG. 1) or otherwise performed. In an example embodiment, the method 400 may involve processing a dispute request during payment processing.

A request for non-reversible payment for a sender is received at block 502. The payment receiver may be identified based on the payment receiver identifier at block 504.

A sender account of the sender is decreased by the payment amount at block 506. The sender account may be decreased by a user transfer cost at block 508. An item receipt notification may be received from the sender indicating that an item associated with the request for non-reversible payment has been received at block 510.

A payment receiver account of the payment receiver is increased by the payment amount at block 512. The target funding source may be decreased by a user transfer cost at block 514. Transaction information associated with the request for non-reversible payment may be stored at block 516.

At block 518, a notification of non-reversible payment that the increasing of the payment receiver account by the payment amount is non-reversible is provided to a payment receiver based on the receiving of the request for non-reversible payment and/or identification of the payment receiver.

A purchase of an item may be processed based on the receiving of the request for non-reversible payment, the decreasing of the sender account and the increasing of the payment receiver account at block 520. The item may be provided to the sender based on the processing of the purchase at block 522.

A dispute request associated with the decreasing of the sender account may be received from the user at block 524. Value in the sender account may be altered based on the request for non-reversible payment and the dispute request at block 526. For example, the alteration of the value may include increasing or decreasing the value. The sender may receive value in the amount of the payment amount, the user transfer cost of the sender, or a different amount.

A write-off indication may be stored (e.g., in the database 108) based on receiving of the request for non-reversible payment and the dispute request at block 528. The write-off indication may be used by the provider 106 to track full or partial write-offs based on payment processing.

The method 500 may be used to keep customers satisfied with the payment processing provided by the provider 106 when a non-reversible payment processing transaction does not occur in a manner that is acceptable to the sender.

Figure 6:
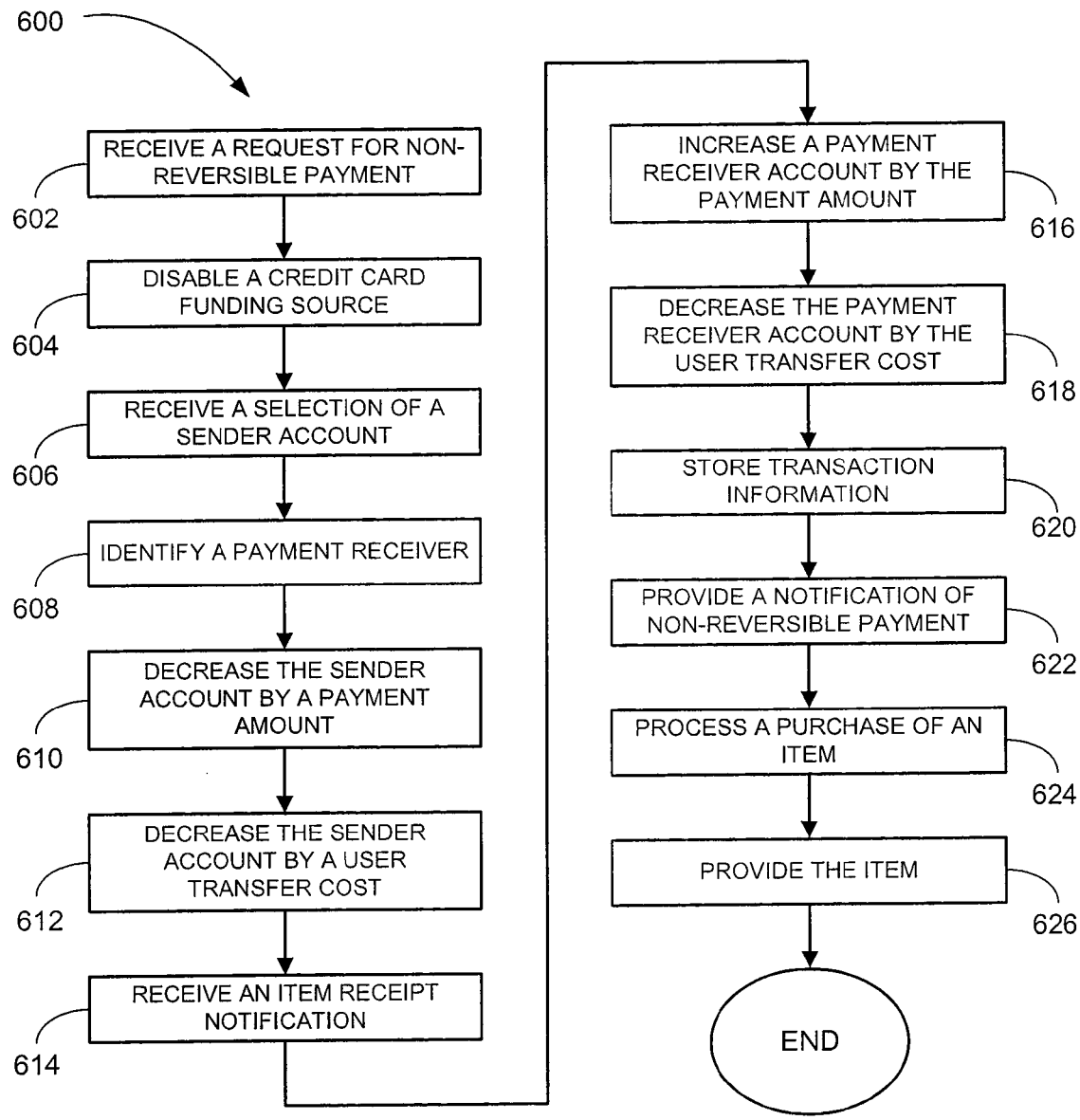

FIG. 6 illustrates a method 600 for payment processing according to an example embodiment. The method 600 may be performed by the client machine 102 and/or the provider 106 of the system 100 (see FIG. 1) or otherwise performed. In an example embodiment, the method 600 may disable a credit card funding source from available user account selections during payment processing.

A request for non-reversible payment for a sender is received at block 602. At block 604, a credit card finding source may be disabled from the available sender accounts based on the receipt of the request for non-reversible payment. The credit card funding source may be disabled to prevent the sender of selecting a funding source for the payment for which the sender can later dispute. The disabling of the credit card funding source may reduce the risk associated with the processing of the payment.

A selection of the sender account from available sender accounts may be received at block 606. The receiving of the selection may be based on the disabling of the credit card funding source. For example, a balance account or a bank account of the sender may be selected as the sender account.

The payment receiver may be identified based on the payment receiver identifier at block 608. A sender account of the sender is decreased by the payment amount at block 610.

The sender account may be decreased by a user transfer cost at block 612. An item receipt notification may be received from the sender that an item associated with the request for non-reversible payment has been received at block 614.

A payment receiver account of the payment receiver is increased by the payment amount at block 616. The target funding source may be decreased by a user transfer cost at block 618. Transaction information associated with the request for non-reversible payment may be stored at block 620.

At block 622, a notification of non-reversible payment that the increasing of the payment receiver account by the payment amount is non-reversible is provided to a payment receiver based on the receiving of the request for non-reversible payment and/or identification of the payment receiver.

A purchase of an item may be processed based on the receiving of the request for non-reversible payment, the decreasing of the sender account and the increasing of the payment receiver account at block 624. The item may be provided to the sender based on the processing of the purchase at block 626.

Figure 7:
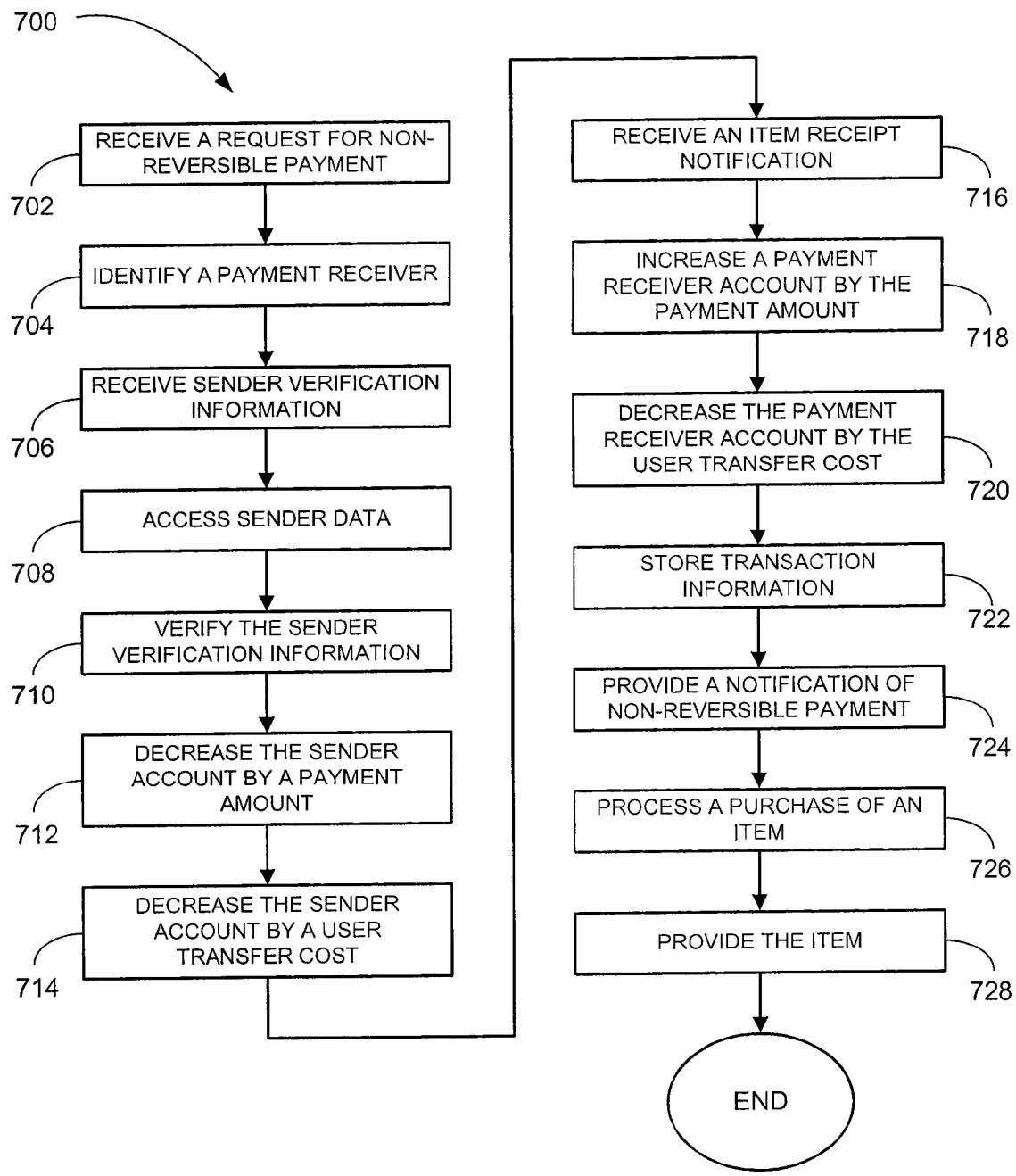

FIG. 7 illustrates a method 700 for payment processing according to an example embodiment. The method 700 may be performed by the client machine 102 and/or the provider 106 of the system 100 (see FIG. 1) or otherwise performed. In an example embodiment, the method 700 may verify sender verification information during payment processing.

A request for non-reversible payment for a sender is received at block 702. The payment receiver may be identified based on the payment receiver identifier at block 704.

Sender verification information may be received at block 706. Sender data (e.g., the user data 112 associated with the sender) associated with the sender may be accessed at block 708. The sender data may include, by way of example, a phone call record, a screen recording, a social security number, an e-mail address, a telephone number, an electronic token, or the like. The sender verification information may be verified at block 710 based on the sender data.

A sender account of the sender is decreased by the payment amount at block 712. The sender account may be decreased by a user transfer cost at block 714. An item receipt notification may be received from the sender that an item associated with the request for non-reversible payment has been received at block 716.

A payment receiver account of the payment receiver is increased by the payment amount at block 718. The target funding source may be decreased by a user transfer cost at block 720. Transaction information associated with the request for non-reversible payment may be stored at block 722.

At block 724, a notification of non-reversible payment that the increasing of the payment receiver account by the payment amount is non-reversible is provided to a payment receiver based on the receiving of the request for non-reversible payment, identification of the payment receiver and/or verification of the sender verification.

A purchase of an item may be processed based on the receiving of the request for non-reversible payment, the decreasing of the sender account and the increasing of the payment receiver account at block 726. The item may be provided to the sender based on the processing of the purchase at block 728.

Figure 8:
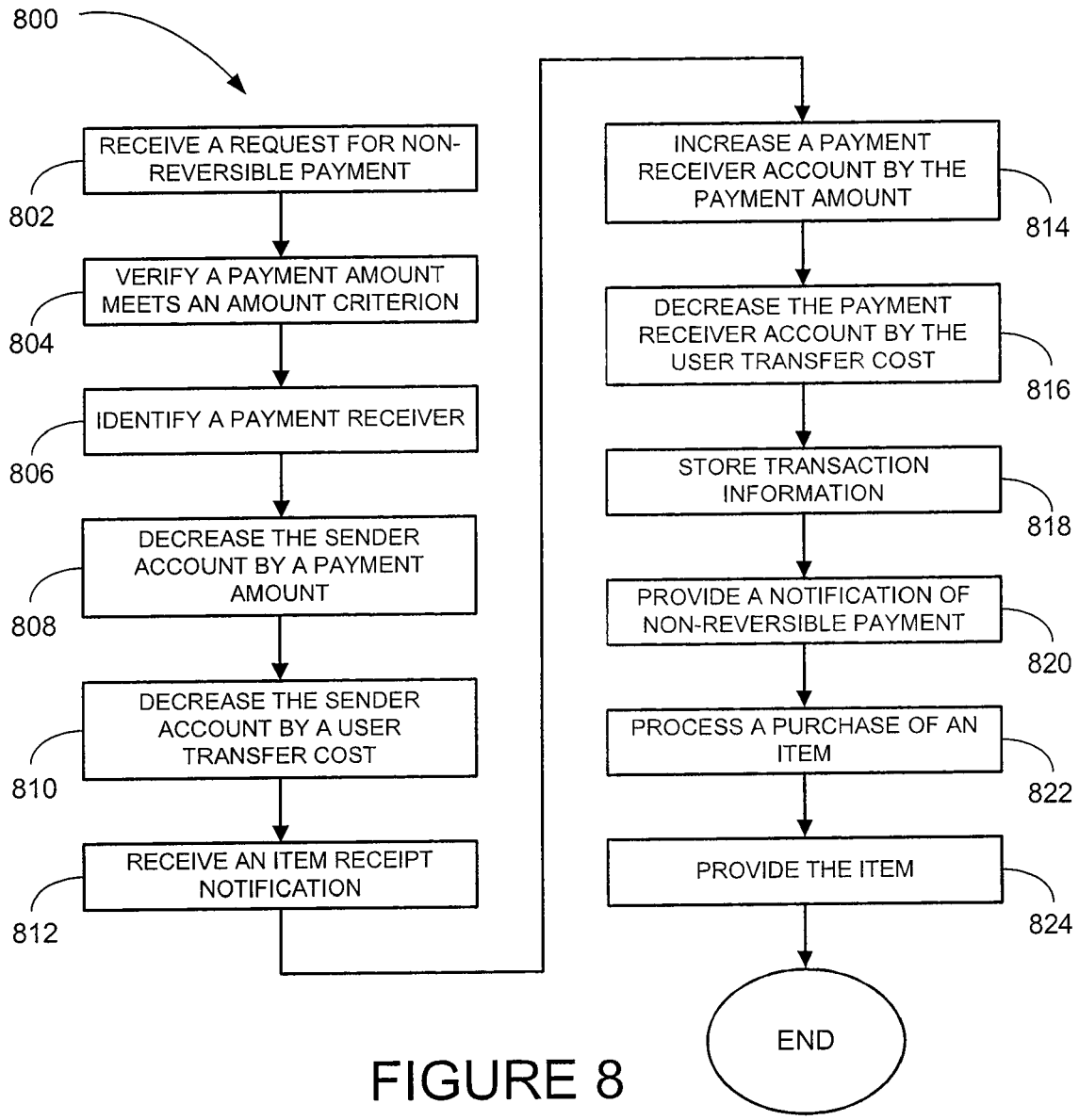

FIG. 8 illustrates a method 800 for payment processing according to an example embodiment. The method 800 may be performed by the client machine 102 and/or the provider 106 of the system 100 (see FIG. 1) or otherwise performed. In an example embodiment, the method 800 may verify a payment amount criterion during payment processing.

A request for non-reversible payment for a sender is received at block 802. At block 804, verification may be made that the payment amount meets an amount criterion. The amount criterion may include that the payment is within an acceptable range. For example, an amount that is too low and/or too high may not be eligible for payment processing.

The payment receiver may be identified based on the payment receiver identifier at block 806.

A sender account of the sender is decreased by the payment amount at block 808. The decreasing of the sender account may be based on the verification of the payment amount. The sender account may be decreased by a user transfer cost at block 810.

An item receipt notification may be received from the sender that an item associated with the request for non-reversible payment has been received at block 812. A payment receiver account of the payment receiver is increased by the payment amount at block 814. The increasing of the payment receiver account may be based on identification of the payment receiver, receipt of the item receipt notification, and/or verification of the payment amount. The target funding source may be decreased by a user transfer cost at block 816.

Transaction information associated with the request for non-reversible payment may be stored at block 818. At block 820, a notification of non-reversible payment that the increasing of the payment receiver account by the payment amount is non-reversible is provided to a payment receiver based on the receiving of the request for non-reversible payment, identification of the payment receiver, and/or verification of the payment amount.

A purchase of an item may be processed based on the receiving of the request for non-reversible payment, the decreasing of the sender account and the increasing of the payment receiver account at block 822. The item may be provided to the sender based on the processing of the purchase at block 824.

Figure 9:
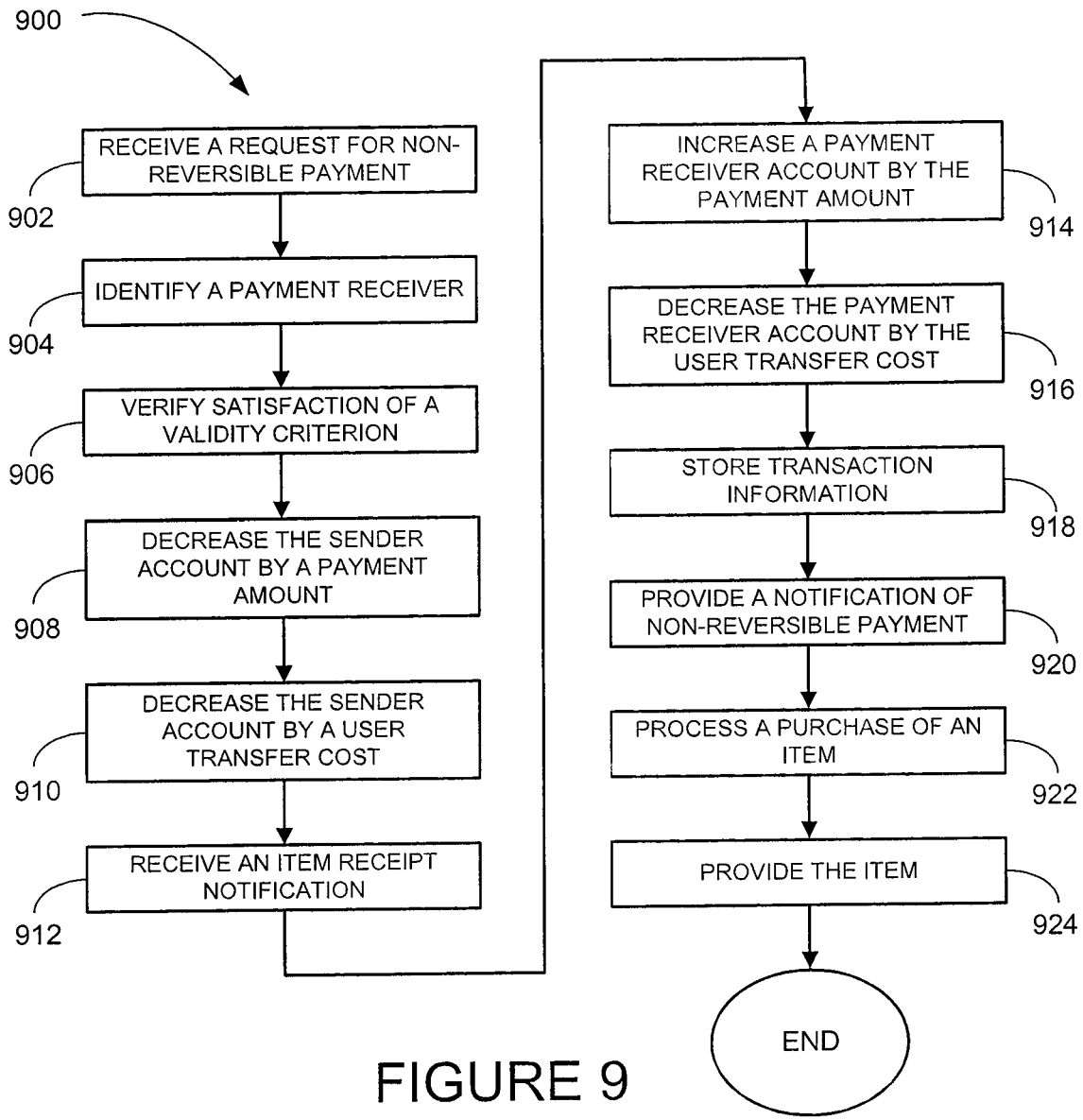

FIG. 9 illustrates a method 900 for payment processing according to an example embodiment. The method 900 may be performed by the client machine 102 and/or the provider 106 of the system 100 (see FIG. 1) or otherwise performed. In an example embodiment, the method 900 may verify satisfaction of a validity criterion during payment processing.

A request for non-reversible payment for a sender is received at block 902. The payment receiver may be identified based on the payment receiver identifier at block 904.

At block 906, verification may be made that the request for non-reversible payment satisfies a validity criterion. The validity criterion may be used to verify that the funding request is a valid request. The validity criterion may include, by way of example, a sender geographical location, a payment receiver geographical location, the payment amount, or combinations thereof. A single validity criterion or multiple validity criteria may be used.

A sender account of the sender is decreased by the payment amount at block 908. The sender account may be decreased by a user transfer cost at block 910. The decreasing of the sender account may be based on satisfaction of the validity criterion. An item receipt notification may be received from the sender that an item associated with the request for non-reversible payment has been received at block 912.

A payment receiver account of the payment receiver is increased by the payment amount at block 914. The increasing of the payment receiver account may be based on identification of the payment receiver, receipt of the item receipt notification, and/or satisfaction of the validity criterion. The target funding source may be decreased by a user transfer cost at block 916.

Transaction information associated with the request for non-reversible payment may be stored at block 918. At block 920, a notification of non-reversible payment that the increasing of the payment receiver account by the payment amount is non-reversible is provided to a payment receiver based on the receiving of the request for non-reversible payment and/or identification of the payment receiver.

A purchase of an item may be processed based on the receiving of the request for non-reversible payment, the decreasing of the sender account and the increasing of the payment receiver account at block 922. The item may be provided to the sender based on the processing of the purchase at block 924.

Figure 10:
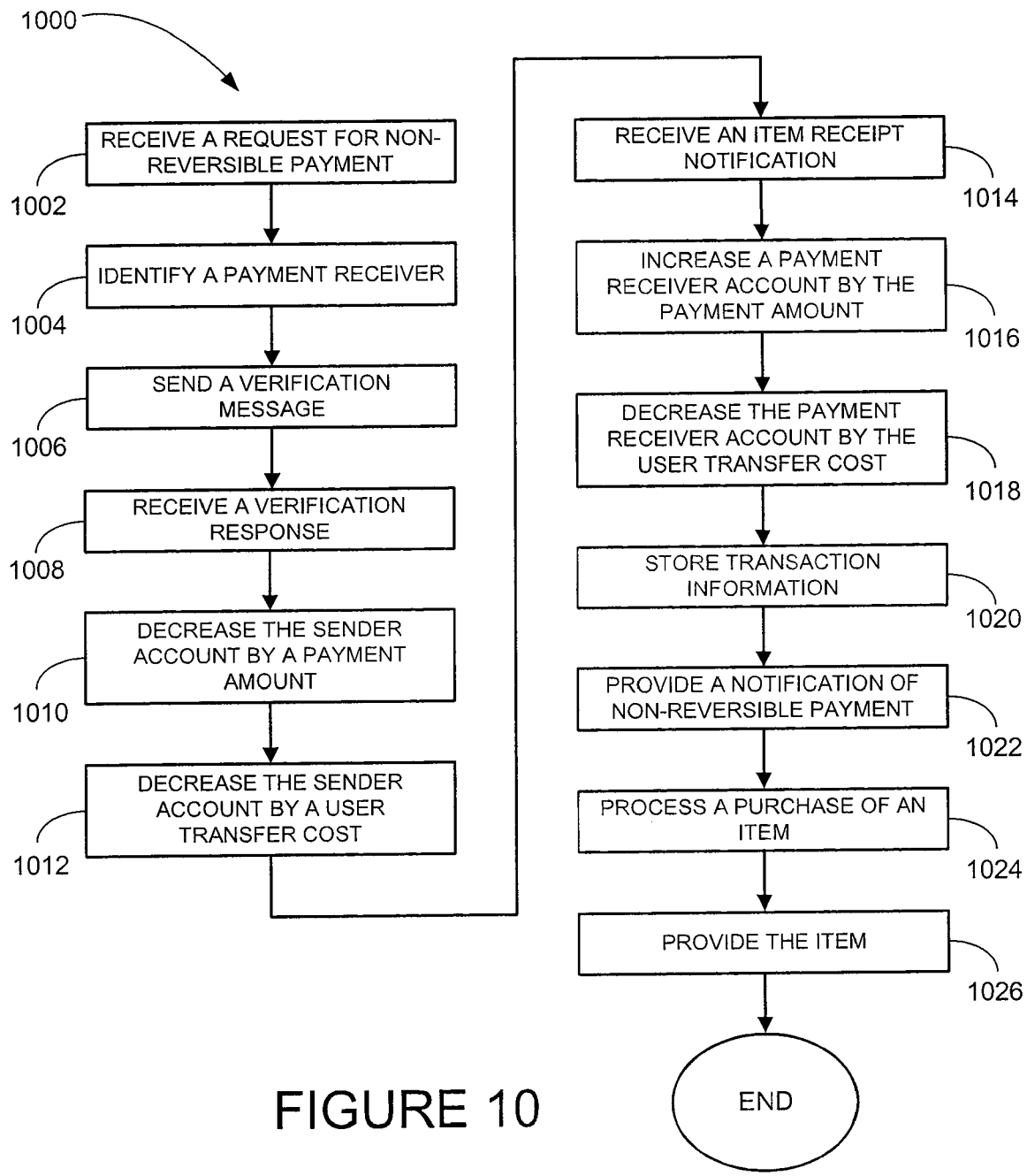

FIG. 10 illustrates a method 1000 for payment processing according to an example embodiment. The method 1000 may be performed by the client machine 102 and/or the provider 106 of the system 100 (see FIG. 1) or otherwise performed. In an example embodiment, the method 1000 may perform user verification during payment processing.

A request for non-reversible payment for a sender is received at block 1002. The payment receiver may be identified based on the payment receiver identifier at block 1004.

A verification message may be sent at block 1006 to the sender and/or the payment receiver. The verification message may, in an example embodiment, be sent to make ensure that the user provided contact information (e.g., an e-mail address) is valid. The verification message may, in an example embodiment, be used to ensure that the sender initiated the payment processing or agreed to the payment processing initiated by the payment receiver. The verification message may be otherwise used. A verification response to the sending of the verification message may be received at block 1008.

A sender account of the sender is decreased by the payment amount at block 1010. The sender account may be decreased by a user transfer cost at block 1012. An item receipt notification may be received from the sender that an item associated with the request for non-reversible payment has been received at block 1014.

A payment receiver account of the payment receiver is increased by the payment amount at block 1016. The target funding source may be decreased by a user transfer cost at block 1018. Transaction information associated with the request for non-reversible payment may be stored at block 1020.

At block 1022, a notification of non-reversible payment that the increasing of the payment receiver account by the payment amount is non-reversible is provided to a payment receiver based on the receiving of the request for non-reversible payment and/or the identification of the payment receiver.

A purchase of an item may be processed based on the receiving of the request for non-reversible payment, the decreasing of the sender account and the increasing of the payment receiver account at block 1024.

The item may be provided to the sender based on the processing of the purchase at block 1026.

Figure 11:
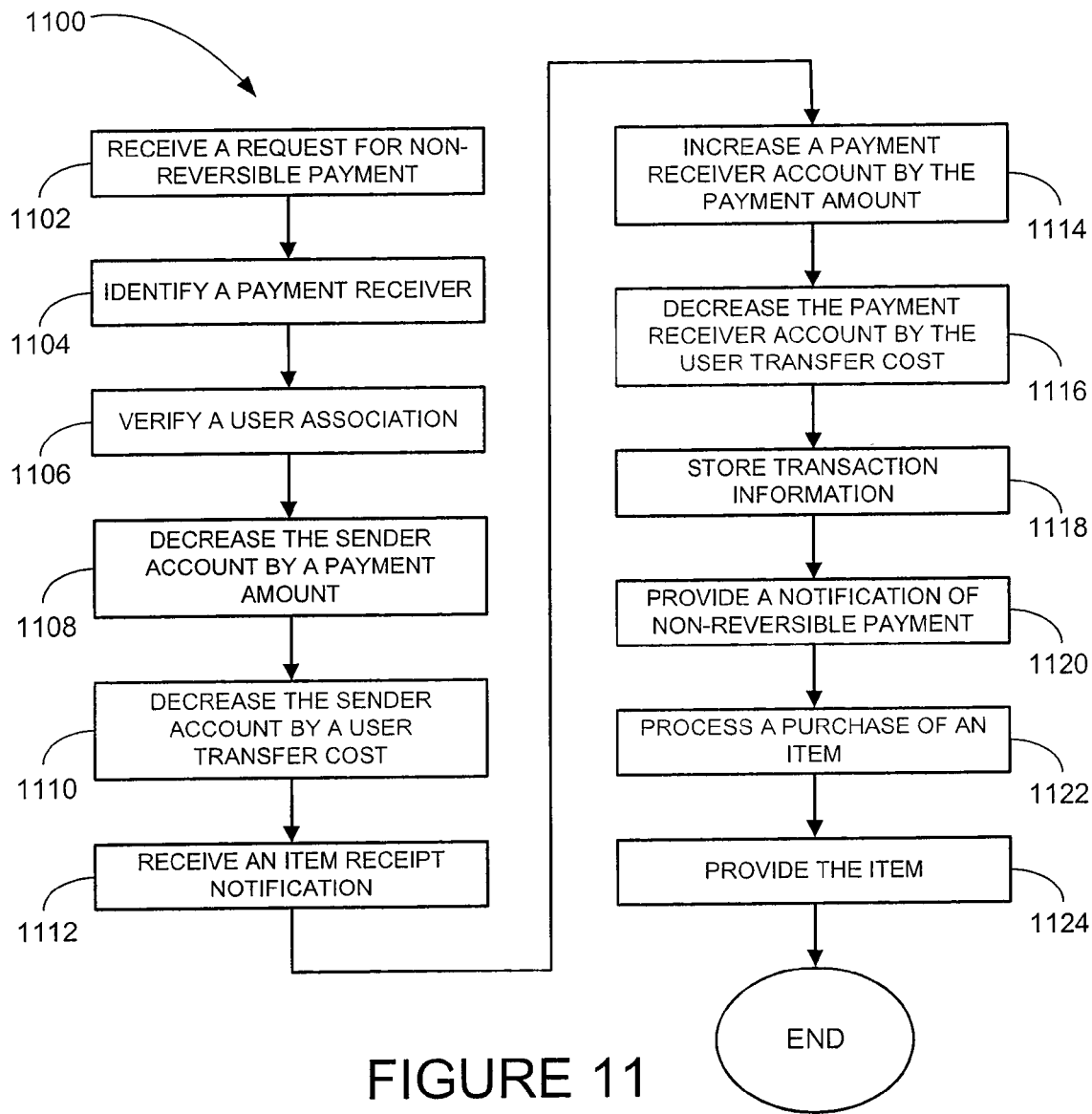

FIG. 11 illustrates a method 1100 for payment processing according to an example embodiment. The method 1100 may be performed by the client machine 102 and/or the provider 106 of the system 100 (see FIG. 1) or otherwise performed. In an example embodiment, the method 1100 may verify a user association during payment processing.

A request for non-reversible payment for a sender is received at block 1102. The payment receiver may be identified based on the payment receiver identifier at block 1104.

A user association between the sender and the payment receiver may be verified at block 1106. The user association may include, by way of example, a prior transaction, a communication session (e.g., using SKYPE communication software, membership in a social network, a business relationship, or combinations thereof.

A sender account of the sender is decreased by the payment amount at block 1108. The sender account may be decreased by a user transfer cost at block 1110. An item receipt notification may be received from the sender that an item associated with the request for non-reversible payment has been received at block 1112.

A payment receiver account of the payment receiver is increased by the payment amount at block 1114. The target funding source may be decreased by a user transfer cost at block 1116. The payment receiver transfer cost may be a fixed transfer cost or a variable transfer cost (e.g., a percentage of the transaction). Transaction information associated with the request for non-reversible payment may be stored at block 1118.

At block 1120, a notification of non-reversible payment that the increasing of the payment receiver account by the payment amount is non-reversible is provided to a payment receiver based on the receiving of the request for non-reversible payment and/or identification of the payment receiver.

A purchase of an item may be processed based on the receiving of the request for non-reversible payment, the decreasing of the sender account and the increasing of the payment receiver account at block 1122.

The item may be provided to the sender based on the processing of the purchase at block 1124.

Figure 12:
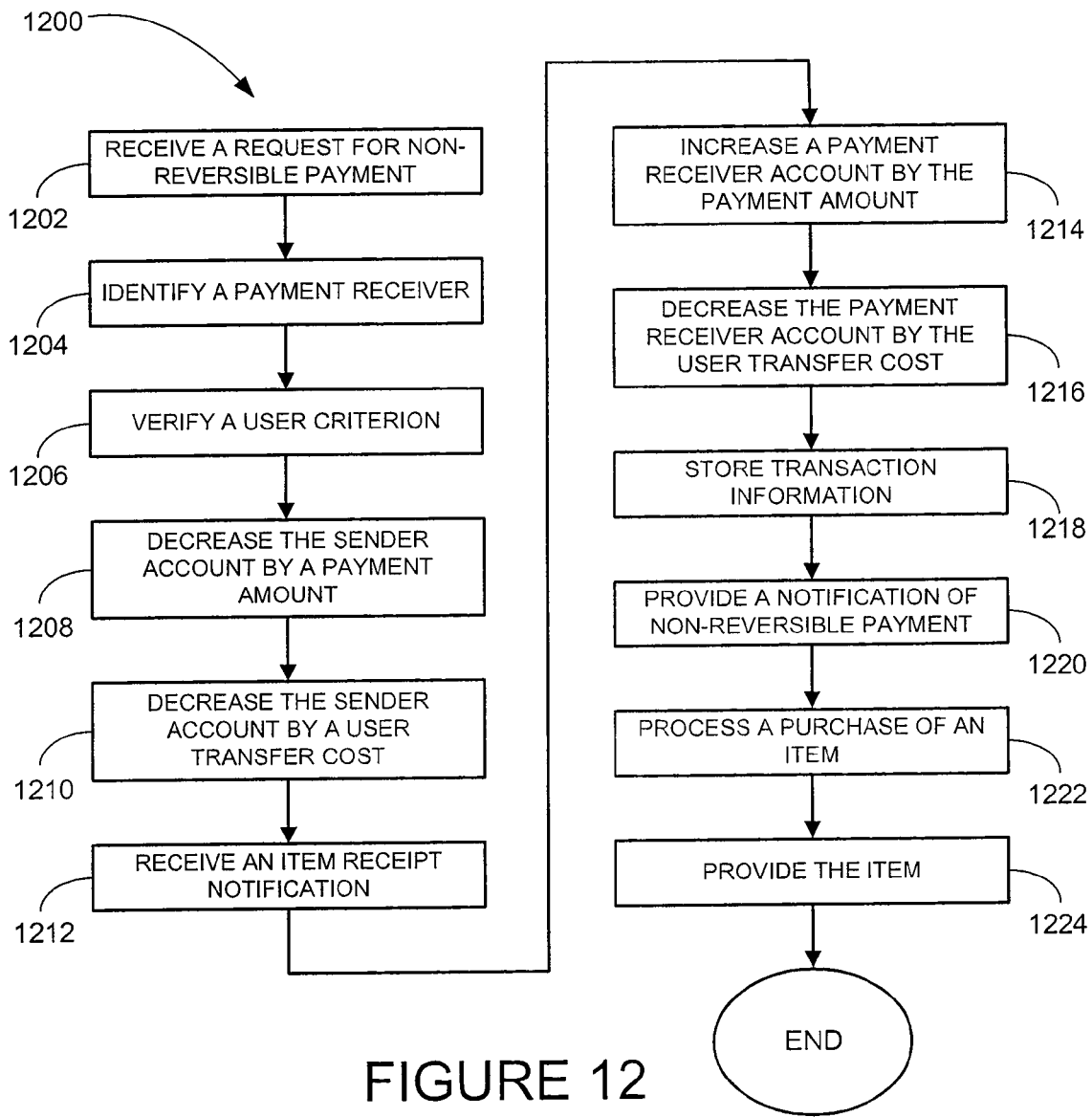

FIG. 12 illustrates a method 1200 for payment processing according to an example embodiment. The method 1200 may be performed by the client machine 102 and/or the provider 106 of the system 100 (see FIG. 1) or otherwise performed. In an example embodiment, the method 1200 may verify a user criterion during payment processing.

A request for non-reversible payment for a sender is received at block 1202. The payment receiver may be identified based on the payment receiver identifier at block 1204.

A user criterion of the sender and/or the payment receiver may be verified at block 1206. The user criterion may include, by way of example, user feedback, a number of transactions associated with the sender, membership in a social network, a membership period with a provider, or the like.

A sender account of the sender is decreased by the payment amount at block 1208. The decreasing of the sender account may be based on verification of the user criterion. The sender account may be decreased by a user transfer cost at block 1210. An item receipt notification may be received from the sender that an item associated with the request for non-reversible payment has been received at block 1212.

A payment receiver account of the payment receiver is increased by the payment amount at block 1214. The increasing of the payment receiver account may be based on identification of the payment receiver, receipt of the item receipt notification, and/or verification of the user criterion. The target funding source may be decreased by a user transfer cost at block 1216. Transaction information associated with the request for non-reversible payment may be stored at block 1218.

At block 1220, a notification of non-reversible payment that the increasing of the payment receiver account by the payment amount is non-reversible is provided to a payment receiver based on the receiving of the request for non-reversible payment and/or on identification of the payment receiver.

A purchase of an item may be processed based on the receiving of the request for non-reversible payment, the decreasing of the sender account and the increasing of the payment receiver account at block 1222.

The item may be provided to the sender based on the processing of the purchase at block 1224. The item may be provided electronically, physically, or may be otherwise provided.

The methods 300-1200 may be used separately or in combination to process payments. For example, the operations performed at block 604, block 606, block 706, block 708, block 710, and block 804 may be used with the methods 300, 400, 500, 900, 1000, 1100, 1200.

Figure 13:
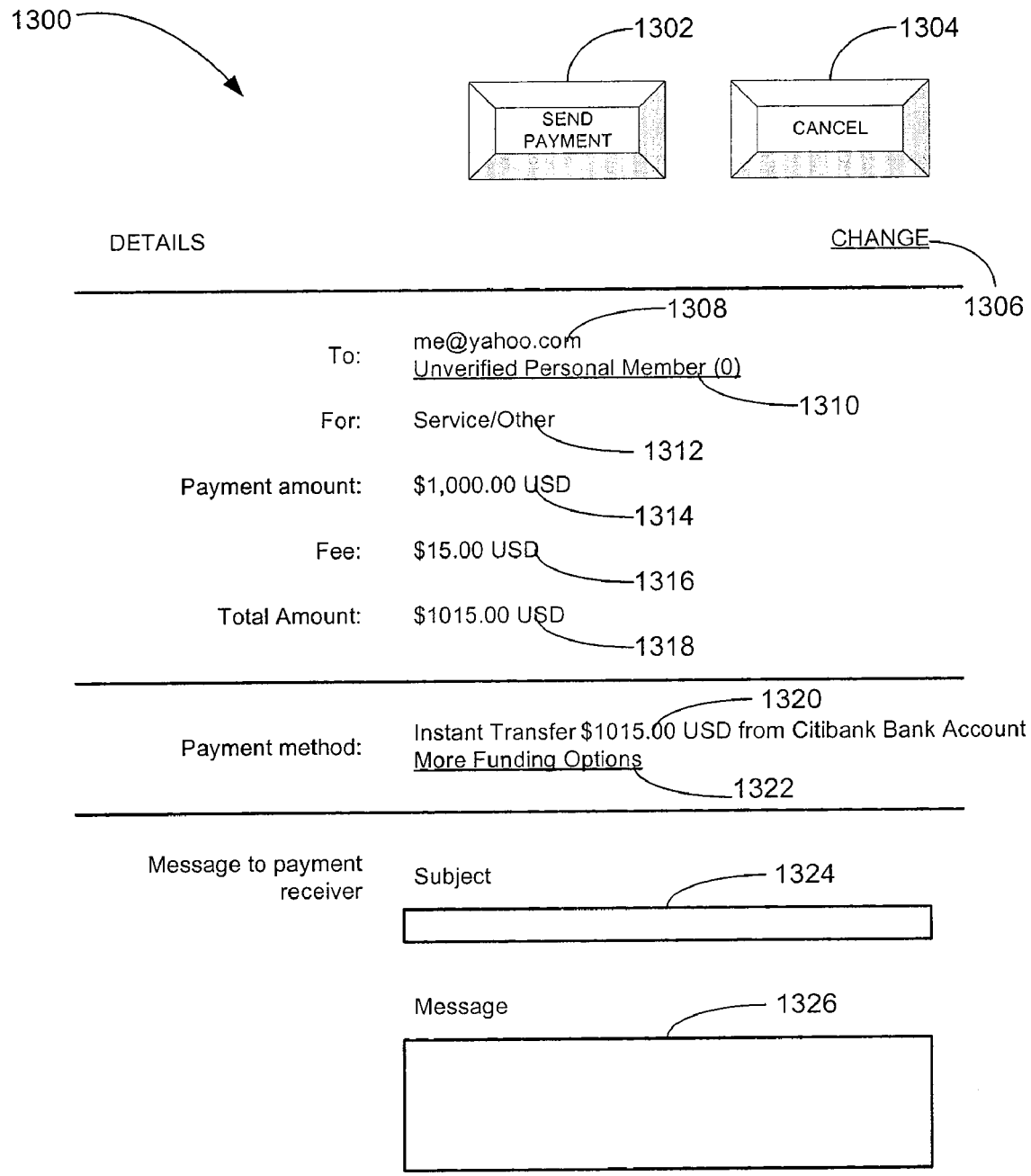
FIG. 13 is an example diagram of a user interface according to an example embodiment.

FIG. 13 is an example diagram of a user interface 1300 according to an example embodiment. The user interface 1300 may be used to provide a request for a non-reversible payment that is received during the operations at block 302, block 402, block 502, block 602, block 702, block 802, block 902, block 1002, block 1102, and/or block 1202. For example, the user interface 1300 may be presented to a user of the client machine 102. The user interface 1300 may be otherwise used.

The user interface 1300 may include a send payment button 1302 and a cancel button 1304. Other buttons may also be included. The send payment button 1302 may be used by a sender to make a request for a non-reversible payment. The cancel button 1304 may be used to cancel a proposed non-reversible payment request.

The user interface 1300 may include details regarding the non-reversible payment request. The details may include a user identifier 1308, an identifier status 1310, a categorization 1312, a payment amount 1314, a fee 1316, a total amount 1318, a selected payment method 1320, a funding option link 1322, a message subject 1324, and/or a message body 1326. Other details may be included.

The user identifier 1308 identifies a payment receiver of the non-reversible payment. The payment receiver may be identified through a user name, an e-mail address, a telephone number, or the like. The identifier status 1310 indicates a status of the payment receiver with the provider 106. For example, the identifier status 1310 may indicate whether the payment receiver has been verified with the provider 106. The categorization 1312 indicates a category for the non-reversible payment.

The payment amount 1314 indicates an amount of the non-reversible payment request. The fee 1316 indicates a fee to be paid by the sender for sending the non-reversible payment. The total amount 1318 indicates a total fee to be paid by the sender for sending the non-reversible payment.

The selected payment method 1320 indicates a selected funding source for the non-reversible payment. The funding option link 1322 may be used to select an alternate payment source for the non-reversible payment.

The sender may include information in the message subject 1324 and the message body 1326 to send a message to the payment receiver along with the non-reversible payment.

Figure 14:
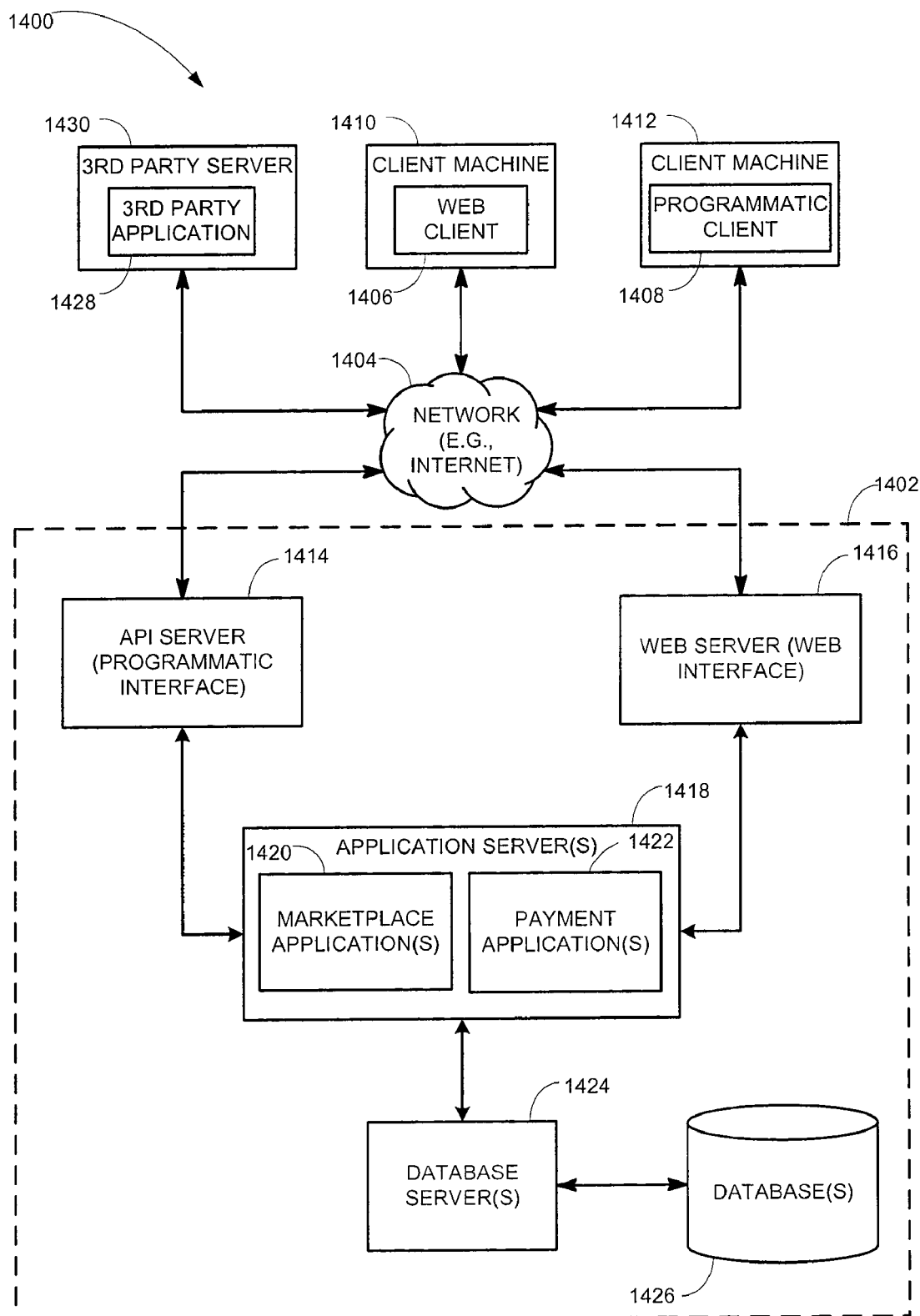
FIG. 14 is a network diagram depicting a network system, according to one embodiment, having a client server architecture configured for exchanging data over a network.

FIG. 14 is a network diagram depicting a client-server system 1400, within which one example embodiment may be deployed. By way of example, a network 1404 may include the functionality of the network 104, the provider 106 may be deployed within an application server 1418, and the client machine 102 may include the functionality of a client machine 1410 or a client machine 1412. The system 1400 may also be deployed in other systems.

A networked system 1402, in the example forms of a network-based marketplace or publication system, provides server-side functionality, via a network 1404 (e.g., the Internet or Wide Area Network (WAN)) to one or more clients. FIG. 14 illustrates, for example, a web client 1406 (e.g., a browser, such as the Internet Explorer browser developed by Microsoft Corporation of Redmond, Wash. State), and a programmatic client 1408 executing on respective client machines 1410 and 1412.

An Application Program Interface (API) server 1414 and a web server 1416 are coupled to, and provide programmatic and web interfaces respectively to, one or more application servers 1418. The application servers 1418 host one or more marketplace applications 1420 and authentication providers 1422. The application servers 1418 are, in turn, shown to be coupled to one or more databases servers 1424 that facilitate access to one or more databases 1426.

The marketplace applications 1420 may provide a number of marketplace functions and services to users that access the networked system 1402. The authentication providers 1422 may likewise provide a number of payment services and functions to users. The authentication providers 1422 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 1420. While the marketplace and authentication providers 1420 and 1422 are shown in FIG. 14 to both form part of the networked system 1402, in alternative embodiments the authentication providers 1422 may form part of a payment service that is separate and distinct from the networked system 1402.

Further, while the system 1400 shown in FIG. 14 employs a client-server architecture, embodiments of the present invention are of course not limited to such an architecture, and could equally well find application in a distributed, or peer-to-peer, architecture system, for example. The various marketplace and authentication providers 1420 and 1422 could also be implemented as standalone software programs, which need not have networking capabilities.

The web client 1406 accesses the various marketplace and authentication providers 1420 and 1422 via the web interface supported by the web server 1416. Similarly, the programmatic client 1408 accesses the various services and functions provided by the marketplace and authentication providers 1420 and 1422 via the programmatic interface provided by the API server 1414. The programmatic client 1408 may, for example, be a seller application (e.g., the TurboLister™ application developed by eBay Inc., of San Jose, Calif.) to enable sellers to author and manage listings on the networked system 1402 in an off-line manner, and to perform batch-mode communications between the programmatic client 1408 and the networked system 1402.

FIG. 14 also illustrates a third party application 1428, executing on a third party server machine 1430, as having programmatic access to the networked system 1402 via the programmatic interface provided by the API server 1414. For example, the third party application 1428 may, utilizing information retrieved from the networked system 1402, support one or more features or functions on a website hosted by the third party. The third party may, for example, provide one or more promotional, marketplace or payment functions that are supported by the relevant applications of the networked system 1402.

Figure 15:
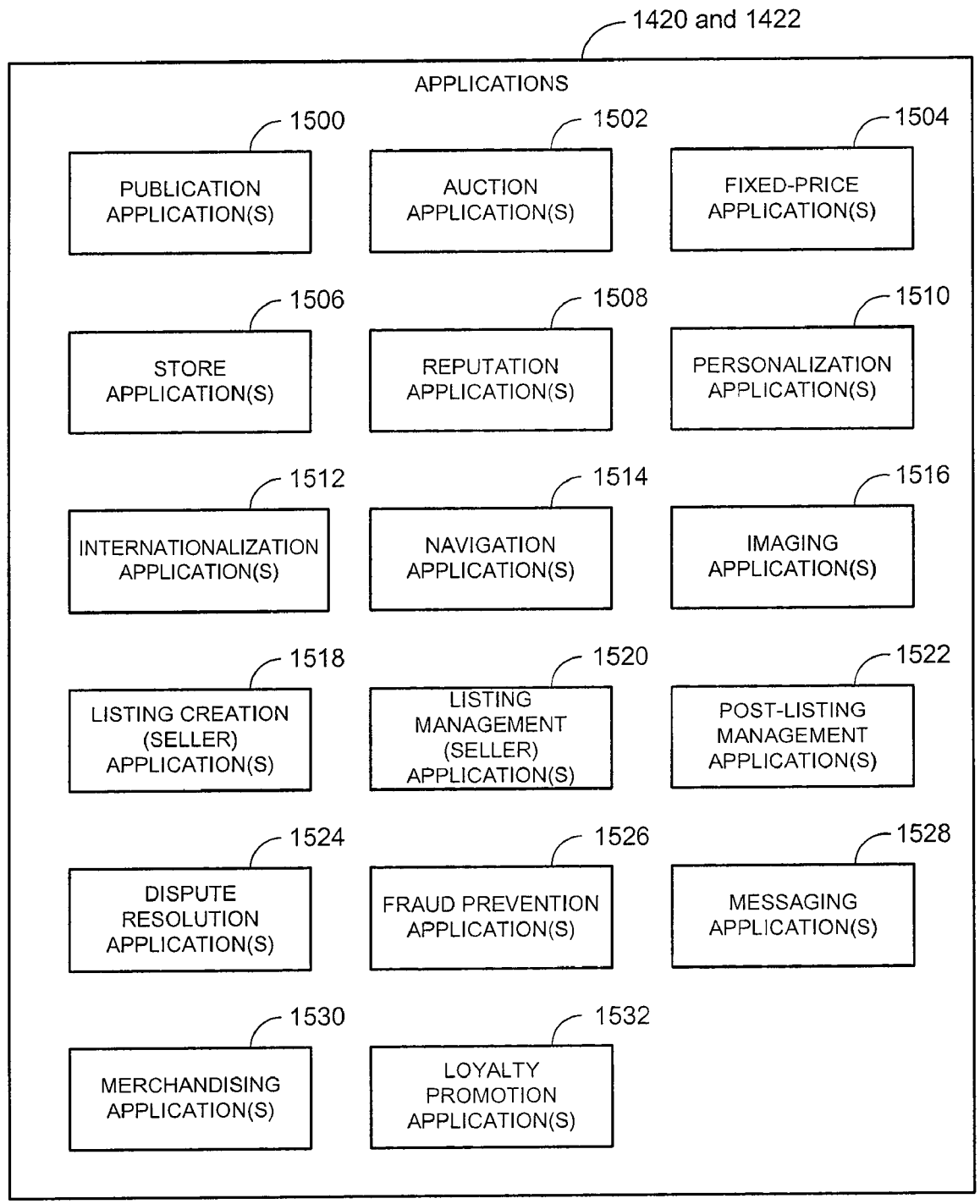
FIG. 15 is a block diagram illustrating an example embodiment of multiple network and marketplace applications, which are provided as part of the network-based marketplace.

FIG. 15 is a block diagram illustrating multiple applications 1420 and 1422 that, in one example embodiment, are provided as part of the networked system 1402 (see FIG. 14). The applications 1420 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 1426 via the database servers 1424.

The networked system 1402 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 1420 are shown to include at least one publication application 1500 and one or more auction applications 1502 which support auction-format listing and price setting mechanisms (e.g., English, Dutch, Vickrey, Chinese, Double, Reverse auctions etc.). The various auction applications 1502 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 1504 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 1506 allow a seller to group listings within a "virtual" store, which may be branded and otherwise personalized by and for the seller. Such a virtual store may also offer promotions, incentives and features that are specific and personalized to a relevant seller.

Reputation applications 1508 allow users that transact, utilizing the networked system 1402, to establish, build and maintain reputations, which may be made available and published to potential trading partners. Consider that where, for example, the networked system 1402 supports person-to-person trading, users may otherwise have no history or other reference information whereby the trustworthiness and credibility of potential trading partners may be assessed. The reputation applications 1508 allow a user, for example through feedback provided by other transaction partners, to establish a reputation within the networked system 1402 over time. Other potential trading partners may then reference such a reputation for the purposes of assessing credibility and trustworthiness.

Personalization applications 1510 allow users of the networked system 1402 to personalize various aspects of their interactions with the networked system 1402. For example a user may, utilizing an appropriate personalization application 1510, create a personalized reference page at which information regarding transactions to which the user is (or has been) a party may be viewed. Further, a personalization application 1510 may enable a user to personalize listings and other aspects of their interactions with the networked system 1402 and other parties.

The networked system 1402 may support a number of marketplaces that are customized, for example, for specific geographic regions. A version of the networked system 1402 may be customized for the United Kingdom, whereas another version of the networked system 1402 may be customized for the United States. Each of these versions may operate as an independent marketplace, or may be customized (or internationalized and/or localized) presentations of a common underlying marketplace. The networked system 1402 may accordingly include a number of internationalization applications 1512 that customize information (and/or the presentation of information) by the networked system 1402 according to predetermined criteria (e.g., geographic, demographic or marketplace criteria). For example, the internationalization applications 1512 may be used to support the customization of information for a number of regional websites that are operated by the networked system 1402 and that are accessible via respective web servers 1416.

Navigation of the networked system 1402 may be facilitated by one or more navigation applications 1514. For example, a search application (as an example of a navigation application) may enable key word searches of listings published via the networked system 1402. A browse application may allow users to browse various category, catalogue, or system inventory structures according to which listings may be classified within the networked system 1402. Various other navigation applications may be provided to supplement the search and browsing applications.

In order to make listings available via the networked system 1402 as visually informing and attractive as possible, the marketplace applications 1420 may include one or more imaging applications 1516 utilizing which users may upload images for inclusion within listings. An imaging application 1516 also operates to incorporate images within viewed listings. The imaging applications 1516 may also support one or more promotional features, such as image galleries that are presented to potential buyers. For example, sellers may pay an additional fee to have an image included within a gallery of images for promoted items.

Listing creation applications 1518 allow sellers conveniently to author listings pertaining to goods or services that they wish to transact via the networked system 1402, and listing management applications 1500 allow sellers to manage such listings. Specifically, where a particular seller has authored and/or published a large number of listings, the management of such listings may present a challenge. The listing management applications 1500 provide a number of features (e.g., auto-relisting, inventory level monitors, etc.) to assist the seller in managing such listings. One or more post-listing management applications 1502 also assist sellers with a number of activities that typically occur post-listing. For example, upon completion of an auction facilitated by one or more auction applications 1402, a seller may wish to leave feedback regarding a particular buyer. To this end, a post-listing management application 1502 may provide an interface to one or more reputation applications 1508, so as to allow the seller conveniently to provide feedback regarding multiple buyers to the reputation applications 1508.

Dispute resolution applications 1514 provide mechanisms whereby disputes arising between transacting parties may be resolved. For example, the dispute resolution applications 1514 may provide guided procedures whereby the parties are guided through a number of steps in an attempt to settle a dispute. In the event that the dispute cannot be settled via the guided procedures, the dispute may be escalated to a merchant mediator or arbitrator.

A number of fraud prevention applications 1526 implement fraud detection and prevention mechanisms to reduce the occurrence of fraud within the networked system 1402.

Messaging applications 1528 are responsible for the generation and delivery of messages to users of the networked system 1402, such messages for example advising users regarding the status of listings at the networked system 1402 (e.g., providing "outbid" notices to bidders during an auction process or to provide promotional and merchandising information to users). Respective messaging applications 1528 may utilize any one have a number of message delivery networks and platforms to deliver messages to users. For example, messaging applications 1528 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 1530 support various merchandising functions that are made available to sellers to enable sellers to increase sales via the networked system 1402. The merchandising applications 1530 also operate the various merchandising features that may be invoked by sellers, and may monitor and track the success of merchandising strategies employed by sellers.

The networked system 1402 itself, or one or more parties that transact via the networked system 1402, may operate loyalty programs that are supported by one or more loyalty/promotions applications 1532. For example, a buyer may earn loyalty or promotions points for each transaction established and/or concluded with a particular seller, and may be offered a reward for which accumulated loyalty points can be redeemed.

Figure 16:
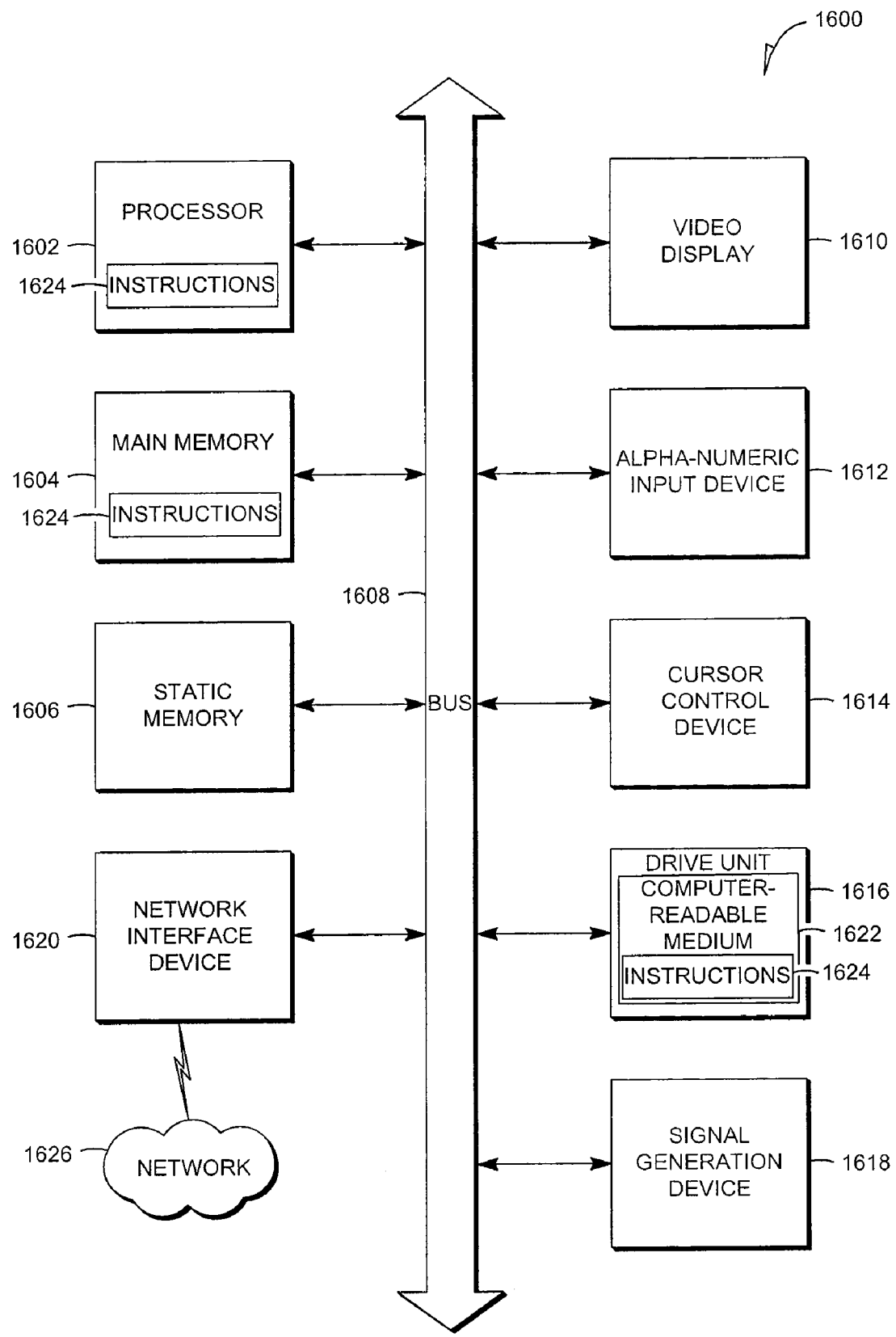
FIG. 16 is a diagrammatic representation of a machine in the example form of a computer system within which a set of instructions for causing the machine to perform any one or more of the methodologies discussed herein may be executed.

FIG. 16 shows a diagrammatic representation of machine in the example form of a computer system 1600 within which a set of instructions may be executed causing the machine to perform any one or more of the methods, processes, operations, or methodologies discussed herein. The provider 106 may operate on one or more computer systems 1600. The client machine 102 may include the functionality of the one or more computer systems 1600.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU) a graphics processing unit (GPU) or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard), a cursor control device 1614 (e.g., a mouse), a drive unit 1616, a signal generation device 1618 (e.g., a speaker) and a network interface device 1620.

The drive unit 1616 includes a machine-readable medium 1622 on which is stored one or more sets of instructions (e.g., software 1624) embodying any one or more of the methodologies or functions described herein. The software 1624 may also reside, completely or at least partially, within the main memory 1604 and/or within the processor 1602 during execution thereof by the computer system 1600, the main memory 1604 and the processor 1602 also constituting machine-readable media.

The software 1624 may further be transmitted or received over a network 1626 via the network interface device 1620.

While the machine-readable medium 1622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

In an example embodiment, a request for non-reversible payment for a sender may be received. The request for non-reversible payment may include a payment amount and a payment receiver identifier. The payment receiver identifier may be associated with a payment receiver. A sender account of the sender may be decreased by the payment amount. A payment receiver account of the payment receiver may be increased by the payment amount. A notification of non-reversible payment may be provided to a payment receiver that the increasing of the payment receiver account by the payment amount is non-reversible based on the receiving of the request for non-reversible payment.

Thus, methods and systems for non-reversible payment processing have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
receiving a request for non-reversible payment for a sender, the request for non-reversible payment including a payment amount and a payment receiver identifier, the payment receiver identifier associated with a payment receiver;
in response to the receiving of the request for non-reversible payment, disabling, using one or more processors, a credit card funding source from a plurality of available sender accounts, the disabling of the credit card funding source prevents the sender from selecting a funding source for the payment from which the sender can later dispute;
receiving, from the sender, a selection of a sender account from the plurality of available sender accounts, the selection is based on the disabling of the credit card funding source;
decreasing, the sender account of the sender by the payment amount;
increasing a payment receiving account of the payment receiver by the payment amount;
and providing a notification of non-reversible payment to the payment receiver that the increasing of the payment receiver account by the payment amount is non-reversible.

2. The computer-implemented method of claim 1, further comprising:
receiving, from the sender, a dispute request associated with the decreasing of the sender account; and
providing a refusal notification to the sender based on the receiving of the request for non-reversible payment and the dispute request, the refusal notification indicating that the non-reversible payment may not be reversed.

3. The computer-implemented method of claim 1, further comprising:
receiving, from the sender, a dispute request associated with the decreasing of the sender account;
altering value in the sender account based on the request for non-reversible payment and the dispute request; and
recording a write-off indication based on the receiving of the request for non-reversible payment and the dispute request.

4. The computer-implemented method of claim 1, further comprising:
decreasing the sender account by a user transfer cost.

5. The computer-implemented method of claim 4 wherein the sender transfer cost is a fixed transfer cost.

6. The computer-implemented method of claim 1, further comprising:
receiving sender verification information;
accessing sender data associated with the sender; and
verifying the sender verification information based on the sender data,
wherein the decreasing of the sender account, increasing of the payment receiver account, and the providing of the notification of non-reversible payment is based on the verifying of the sender verification.

7. The computer-implemented method of claim 6 wherein the sender data includes at least one selection from the group consisting of a phone call record, a screen recording, a social security number, an e-mail address, a telephone number, and an electronic token.

8. The computer-implemented method of claim 1, further comprising:
verifying the payment amount meets an amount criterion,
wherein the decreasing of the sender account, increasing of the payment receiver account, and the providing of the notification of non-reversible payment is based on the verifying of the payment amount.

9. The computer-implemented method of claim 1, further comprising:
processing purchase of an item based on the receiving of the request for non-reversible payment, the decreasing of the sender account and the increasing of the payment receiver account.

10. The computer-implemented method of claim 1, further comprising:
verifying whether the request for non-reversible payment satisfies a validity criterion,
wherein the decreasing of the sender account and the increasing of the payment receiver account is based on satisfying the validity criterion.

11. The computer-implemented method of claim 10, wherein the validity criterion includes at least one selection from the group consisting of a sender geographical location, a payment receiver geographical location, and the payment amount.

12. The computer-implemented method of claim 1, further comprising:
sending a verification message to the sender; and
receiving a verification response to the sending of the verification message,
wherein the decreasing of the sender account and the increasing of the payment receiver account is based on the receiving of the verification response.

13. The computer-implemented method of claim 1, further comprising:
verifying a user association between the sender and the payment receiver;
wherein the decreasing of the sender account and the increasing of the payment receiver account is based on the verifying of the user association, 14. The computer-implemented method of claim 13, wherein the user association includes at least one selection from the group consisting of a prior transaction, a communication session, membership in a social network, and a business relationship.

15. The computer-implemented method of claim 1, further comprising:
verifying a user criterion of the sender;
wherein the decreasing of the sender account and the increasing of the payment receiver account is based on the verifying of the user criterion.

16. The computer-implemented method of claim 15, wherein the user criterion includes at least one selection from the group consisting of user feedback, a number of transactions associated with the sender, membership in a social network, and a membership period with a provider.

17. The computer-implemented method of claim 1, wherein the decreasing comprises:
providing a payment transaction request to an automatic clearing house (ACH) to decrease the sender account by the payment amount.

18. The computer-implemented method of claim 1, wherein the sender account is a balance account or a bank account.

19. The computer-implemented method of claim 1, further comprising:
receiving item receipt notification from the sender that an item associated with the request for non-reversible payment has been received,
wherein the increasing of the payment receiver account is based on the receiving of the item receipt notification.

20. A non-transitory machine-readable medium comprising instructions, which when implemented by one or more processors, cause the one or more processors to perform operations comprising:
receiving a request for non-reversible payment for a sender, the request for non-reversible payment including a payment amount and a payment receiver identifier, the payment receiver identifier associated with a payment receiver;
in response to the receiving of the request for non-reversible payment, disabling a credit card funding source from a plurality of sender accounts, the disabling of the credit card funding source prevents the sender from selecting a funding source for the payment from which the sender can later dispute;
in response to the disabling of the credit card funding source, receiving from the sender a selection of a sender account from the plurality of available sender accounts;
decreasing the sender account of the sender by the payment amount;
increasing a payment receiver account of the payment receiver by the payment amount; and
providing a notification of non-reversible payment to the payment receiver that the increasing of the payment receiver account by the payment amount is non-reversible.

21. The non-transitory machine-readable medium of claim 20 wherein the operations further comprise:
receiving, from the sender, a dispute request associated with the decreasing of the sender account; and
providing a refusal notification to the sender based on receiving the request for non-reversible payment and the dispute request.

22. The non-transitory machine-readable medium of claim 20 wherein the operations further comprise:
verifying a user criterion of the sender;
wherein the decrease of the sender account and the increase of the payment receiver account is based on the verifying of the user criterion.

23. A system comprising:
a funding request receiver module to receive a request for non-reversible payment to a sender, the request for non-reversible payment including a payment, amount and a payment receiver identifier, the payment receiver identifier associated with a payment receiver;
a disabler module, stored on one or more processors, that disables a credit card funding source from a plurality of available sender accounts in response to the received request for non-reversible payment, the disablement of the credit card funding source prevents the sender from selecting a funding source for the payment from which the sender can later dispute;
an account selection receiver module that receives a selection of a sender account from the plurality of available sender accounts, the selection of the sender account is based on the credit card funding source that is disabled;
a user account module to decrease the sender account of the sender by the payment amount and increase a payment receiver account of the payment receiver by the payment amount; and
a notification provider module to provide a notification of non-reversible payment to the payment receiver that the increasing of the payment receiver account by the payment amount is non-reversible.

24. The system of claim 23, further comprising:
a dispute request receiver module to receive, from the sender, a dispute request associated with the decreasing of the sender account by the user account module; and
a write-off module to alter value in the sender account based on the request for non-reversible payment and the dispute request and record a write-off indication based on receiving the request for non-reversible payment and the dispute request.

25. A computer-implemented method comprising:
receiving a request for non-reversible payment for a sender, the request for non-reversible payment including a payment amount and a payment receiver identifier, the payment receiver identifier associated with a payment receiver;
in response to the receiving of the request for non-reversible payment, disabling, using at least one processor, a credit card funding source from a plurality of available sender accounts, the disabling of the credit card funding source prevents the sender from selecting a funding source for the payment from which the sender can later dispute; and
receiving, from the sender, a selection of a sender account from the plurality of available sender accounts, the selection is based on the disabling of the credit card funding source.

* * * * *

UNITED STATES PATENT AND TRADEMARK OFFICE
CERTIFICATE OF CORRECTION

PATENT NO. : 8,108,278 B2
APPLICATION NO. : 12/211172
DATED : January 31, 2012
INVENTOR(S) : Boyan G. Tzekin et al.

It is certified that error appears in the above-identified patent and that said Letters Patent is hereby corrected as shown below:

In column 7, line 33, delete "finding" and insert -- funding --, therefor.

In column 19, line 20, in Claim 12, delete "response," and insert -- response. --, therefor.

In column 19, line 27, in Claim 13, delete "association," and insert -- association. --, therefor.

In column 20, line 35, in Claim 23, delete "payment," and insert -- payment --, therefor.

Signed and Sealed this
Twenty-fourth Day of April, 2012

David J. Kappos
*Director of the United States Patent and Trademark Office*